United States Patent
Heckmeier et al.

(10) Patent No.: US 6,878,421 B2
(45) Date of Patent: Apr. 12, 2005

(54) LIQUID CRYSTALLINE MEDIUM

(75) Inventors: Michael Heckmeier, Bensheim (DE); Martin Engel, Darmstadt (DE); Brigitte Schuler, Haibach (DE); Matthias Bremer, Darmstadt (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/416,923

(22) PCT Filed: Sep. 17, 2001

(86) PCT No.: PCT/EP01/10699

§ 371 (c)(1),
(2), (4) Date: May 16, 2003

(87) PCT Pub. No.: WO02/46330

PCT Pub. Date: Jun. 13, 2002

(65) Prior Publication Data

US 2004/0036058 A1 Feb. 26, 2004

(30) Foreign Application Priority Data

Dec. 6, 2000 (DE) .......................... 100 60 472

(51) Int. Cl.[7] .................. C09K 19/32; C09K 19/30; C09K 19/12; C09K 19/34; C09K 19/20

(52) U.S. Cl. ............. 428/1.1; 252/299.62; 252/299.63; 252/299.66; 252/299.64; 252/299.65; 252/299.61

(58) Field of Search ................. 428/1.1; 252/299.61, 252/299.62, 299.63, 299.64, 299.65, 299.66, 292.62

(56) References Cited

U.S. PATENT DOCUMENTS 4,601,547 A * 7/1986 Shingu ...................... 349/165

5,744,058 A 4/1998 Reiffenrath et al.

FOREIGN PATENT DOCUMENTS

| DE | 4303634 | | 8/1994 |
| DE | 4409526 | | 9/1995 |
| DE | 19520246 | | 12/1995 |
| JP | 62-181247 | * | 8/1987 |
| JP | 62-195355 | * | 8/1987 |
| JP | 6-263663 | * | 9/1994 |

OTHER PUBLICATIONS

English translation by computer for JP 6–263663, http://www4.ipdl.jpo.go.jp/Tokujitu/PAJdetail.ipdl?N0000=60&N0120=01&N2001=2&N3001=H06-263663.*
English abstract for JP 62–181247, 1987.*
English abstract for JP 62–195355, 1987.*
Database WPI, Section Ch. Week 199442, Derwent Publications Ltd., London, GB; Class E14, AN 1994–338220, XP002188660 & JP 06 263663 A (Asahi Glass Co Ltd), Sep. 20, 1994, Summary.
Database WPI, Section Ch, Week 198737, Derwent Publication Ltd., London, GB; Class E14, AN 1987–260922, XP002188661 & JP 62 181247 A (Asahi Glass Co Ltd), Aug. 8, 1987, Summary.
Database WPI, Section Ch, Week 198740, Derwent Publication Ltd., London, GB; Class E14, AN 1987–280990, XP002188662 & JP 62 195355 A (Asahi Glass Co Ltd), Aug. 28, 1987, Summary.

* cited by examiner

*Primary Examiner*—Shean C. Wu
(74) *Attorney, Agent, or Firm*—Millen, White, Zelano, Branigan, P.C.

(57) ABSTRACT

The invention relates to a liquid crystalline medium, based on a mixture of polar compounds with a positive dielectric anisotropy. Said medium is characterised in that it contains one or more compounds of formula (I) wherein R, $A^1$, $A^2$, $Z^1$, $Z^2$, $X^1$, $X^2$, n and o are defined as per claim 1.

20 Claims, No Drawings

LIQUID CRYSTALLINE MEDIUM

The present invention relates to a liquid-crystalline medium, to the use thereof for electro-optical purposes, to displays containing this medium, and to novel compounds for use in the liquid-crystalline medium according to the invention.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP ("deformation of aligned phases") cells, guest/host cells, TN cells having a twisted nematic structure, STN ("supertwisted nematic") cells, SBE ("superbirefringence effect") cells, OMI ("optical mode interference") cells, OCB ("optically compensated bend mode") and IPS ("in-plane-switching") cells.

The commonest display devices are based on the Schadt-Helfrich effect and have a twisted nematic structure, wie z.B. in TN— und STN-Zellen. Sie können als Multiplex-oder als Aktivmatrix-Anzeigen (AMD-TN, AMD active matrix driven) betrieben werden.

In the case of TN displays, liquid-crystal media are desired which enable the following advantages in the cells: an expanded nematic phase range (in particular down to low temperatures), switchability at extremely low temperatures (outdoor use, automobiles, avionics) and increased resistance to UV radiation (longer service life). With the media available from the prior art, however, it is not possible to achieve these advantages while simultaneously retaining the above parameters.

In the case of the more highly twisted STN displays, liquid-crystal media are desired which enable greater multiplex ability and/or lower threshold voltages and/or broader nematic phase ranges (in particular at low temperatures). To this end, a further extension of the available parameter latitude (clearing point, smectic-nematic transition or melting point, viscosity, dielectric parameters, elastic parameters) is urgently desired.

OCB displays contain a liquid-crystal layer having a so-called "bend" structure. The "bend" cell, also known as "π" cell, was proposed for the first time by P. Bos et al., SID 83 Digest, 30 (1983), for electrically controllable λ/s retardation plates. Optical displays based on the OCB cell have been described by Y. Yamaguchi, T. Miyashita and T. Uchida, SID 93 Digest, 277 (1993), T. Miyashita et al. in Proc. Eurodisplay, 149 (1993), J. Appl. Phys. 34, L177 (1995), SID 95 Digest, 797 (1995), and C.-L. Kuo et al., SID 94 Digest, 927 (1994). OCB cells usually contain a liquid-crystal layer having a homogeneous edge alignment (i.e. parallel to the surfaces) and positive dielectric anisotropy. In addition, the OCB displays disclosed in the above-mentioned documents usually have one or more optical retardation films in order to reduce undesired light transmission of the "bend" cell in the dark state. OCB displays have some advantages over conventional TN cells, such as, for example, a wider viewing angle and shorter response times.

OCB displays require liquid-crystalline media which have to satisfy a multiplicity of requirements. Particularly important here are the chemical resistance to moisture, air and physical influences, such as heat, radiation in the infrared, visible and ultraviolet region, and direct and alternating electric fields. Furthermore, liquid-crystal media for the OCB effect which can be used industrially are required to have a liquid-crystalline phase in a suitable temperature range, relatively high birefringence, positive dielectric, anisotropy, a relatively low value for the ratio of the elastic constants $K_3/K_1$ and low viscosity. There is thus a great demand for liquid-crystalline media for OCB displays which exhibit, in particular, high values for the birefringence and dielectric anisotropy and at the same time low viscosities.

Besides the known liquid-crystal displays (TN, STN, OMI, AMD-TN and OCB), in which the electric fields for realignment are generated essentially perpendicular to the liquid-crystal layer, displays also exist in which the electric signals are generated in such a way that the electric fields have a significant component parallel to the liquid-crystal layer. A display of this type, known as an IPS ("in-plane switching") display, is disclosed, for example, in international patent application WO 91/10936. The principles, of operation of a display of this type are described, for example, by R. A. Soref in Journal of Applied Physics, Vol. 45, No. 12, pp., 5466–5468 (1974). For example, EP 0 588 568 discloses various possibilities for the design of the electrodes and for addressing a display of this type. DE 198 24 137 likewise describes various embodiments of IPS displays of this type. Liquid-crystalline materials for IPS displays are described, for example, in DE 195 28 104.

The IPS displays containing the known liquid-crystalline media are characterised by inadequate, long response times and often by excessively high operating voltages. There is thus a demand for liquid-crystal media for IPS displays which do not have these disadvantages or only do so to a lesser extent. To this end, there is a particular requirement for liquid-crystalline materials which, besides an adequate phase range, a low tendency toward crystallisation at low temperatures, low birefringence and adequate electrical resistance, have, in particular, low threshold voltages ($V_{10}$) and low rotational viscosities ($γ_1$), which are crucial for the response times.

Just like TN displays, OCB and IPS displays can also be operated as matrix displays.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is generally arranged in such a way that a filter element is opposite each switchable pixel.

The TFT displays usually operate as TN cells with crossed polarisers in transmission and are illuminated from the back. In the case of OCB displays, reflective displays have also been proposed, for example by T. Uchida, T. Ishinabe and M. Suzuki in SID 96 Digest, 618 (1996).

The term MLC displays here covers any matrix display with integrated non-linear elements, i.e., besides the active matrix, also displays with passive elements, such as varistors or diodes (MIM=metal-insulator-metal).

For matrix liquid-crystal displays having integrated non-linear elements for switching individual pixels (MLC displays), liquid-crystal media having large positive dielectric anisotropy, broad nematic phases, relatively low birefringence, very high specific resistance, good UV and temperature stability and low vapour pressure are desired.

MLC displays are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible decrease with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

Besides liquid-crystal displays which use back lighting, i.e. are operated transmissively and optionally transflectively, there is also particular interest in reflective liquid-crystal displays. These reflective liquid-crystal displays use the ambient light for information display. They thus consume significantly less energy than back-lit liquid-crystal displays of corresponding size and resolution. Since the TN effect is characterised by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence (Δn) is necessary in order to achieve low optical retardation (d·Δn). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness through which the light passes is approximately twice as great as in transmissive displays of the same layer thickness.

There thus continues to be a great demand for MLC displays having very high specific resistance at the same time as a large working-temperature range, short response times even at low temperatures and low threshold voltage which do not have these disadvantages, or only do so to a reduced extent.

In general, liquid-crystal materials for the above-mentioned display types must have good chemical and thermal stability and good stability towards electric fields and electromagnetic radiation. Furthermore, the liquid-crystal materials should have low viscosity and give short addressing times, low threshold voltages and high contrast in the cells.

Furthermore, they should have a suitable mesophase, for example a nematic or cholesteric mesophase for the above-mentioned cells, at usual operating temperatures, i.e. in the broadest possible range below and above room temperature. Since liquid crystals are generally used in the form of mixtures of a plurality of components, it is important that the components are readily miscible with one another. Other properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

None of the series of compounds having a liquid-crystalline phase that have been disclosed hitherto contains a single compound which meets all the above-mentioned requirements. In general, therefore, mixtures of from 2 to 25, preferably from 3 to 18, compounds are prepared in order to obtain substances which can be used as liquid-crystal phases. However, it has not been easy to prepare optimum phases in this way, since no liquid-crystal materials having high birefringence, positive dielectric anisotropy and high clearing point at the same time as low rotational viscosity were available hitherto.

The invention has the object of providing liquid-crystalline media, in particular for the above-mentioned MLC, TN, STN, OCB and IPS displays, which meet the above-mentioned requirements, do not have the above-mentioned disadvantages, or only do so to a lesser extent, and preferably at the same time have very high specific resistance values and low threshold voltages.

It has now been found that the above-described-objects can be achieved if media according to the invention are used in displays.

The invention thus relates to a liquid-crystalline medium based on a mixture of polar compounds, characterised in that it comprises one or more compounds of the formula I

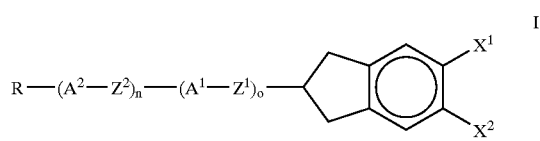

in which
R is F, Cl, Br, I, CN, NCS, SF$_5$ or an alkyl radical having from 1, to 12 carbon atoms which is unsubstituted, monosubstituted by CN or CF$_3$ or monosubstituted or polysubstituted by halogen and in which one or two non-adjacent CH$_2$ groups may be replaced by —O—, —CH=CH—, —CF=CF—, —C≡C—, —CO—, —OCO—, or —COO— in such a way that O atoms are not linked directly to one another,
A$^1$ and A$^2$ are each, independently of one another, 1,4-phenylene, in which, in addition, one or two CH groups may be replaced by N and which may also be monosubstituted or polysubstituted by L, or are trans-1,4-cyclohexylene, in which, in addition, one or more non-adjacent CH$_2$ groups may be replaced by —O— and/or —S—, or are 1,4-cyclohexenylene, 1,4-bicyclo-[2.2.2] octylene, piperidine-1,4-diyl, naphthalene-2,6-diyl, decahydronaphthalene-2,6-diyl or 1,2,3,4-tetrahydronaphthalene-2,6-diyl,
L is F, Cl, Br, I, CN, NCS, SF$_5$ or alkyl, alkoxy, alkylcarbonyl, alkylcarbonyloxy, alkoxycarbonyl, alkenyl or oxaalkenyl having from 1 to 3 carbon atoms, in which, in addition, one or more H atoms may be replaced by F or Cl, $Z^1$ and $Z^2$ are each, independently of one another, —$CH_2O$—, —$OCH_2$—, —$CF_2O$—, —$OCF_2$—, —COO—, —OCO—, —$CF_2CF_2$—, —$CH_2CH_2$—, —$(CH_2)_4$—, —$(CH_2)_3O$—, —$O(CH_2)_3$—, —$CF_2CH_2$—, —CH=CH—, —CH=CF—, —CF=CF—, —C≡C— or a single bond, $X^1$ and $X^2$ are each, independently of one another, F, Cl, Br, I, CN, NCS, $SF_5$ or alkyl, alkoxy, alkylcarbonyl, alkylcarbonyloxy, alkoxycarbonyl, alkenyl or oxaalkenyl having up to 5 carbon atoms, in which, in addition, one or more H atoms may be replaced by F or Cl, and one of the radicals $X^1$ and $X^2$ is alternatively H or R.

n and o are each, independently of one another, 0, 1 or 2, where n+o is ≦3.

The compounds of the formula I have low rotational viscosities at the same time as favourable clearing points and high dielectric anisotropy Δε, and effect a reduction in the threshold voltage in the media according to the invention at the same time as an optimisation of the low-temperature behaviour. They are particularly suitable for use in TFT-TN displays with all common operating voltages (driver voltage of 5 V, 4 V, 3.3 V and 2.5 V), in particular for TFT-TN displays having low threshold voltages (driver voltage of 2.5 and 3.3 V), and, owing to their favourable birefringence values, for TN displays at the first Gooch and Tarry transmission minimum [C. H. Gooch and H. A. Tarry, Electron. Left. 10, 2–4, 1974, and Appl. Phys., Vol. 8, 1575–1584, 1975].

The compounds of the formula I have a broad range of applications. These compounds can be used as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or to optimise its threshold voltage and/or its viscosity.

In the pure state, the compounds of the formula I are colourless and form liquid-crystalline mesophases in a temperature range which is favourably located for electro-optical use. They are stable chemically, thermally and to light. The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. Some compounds of the formula I and their preparation are disclosed in DE 43 03 634 and DE 44 09 526. The novel compounds of the formula I are a further subject-matter of the invention.

Particular preference is given to compounds of the formula I in which n+o is 0 or 1.

Preference is furthermore given to compounds of the formula I and their sub-formulae in which one or both radicals $X^1$ and $X^2$ are F, Cl, CN or fluorinated alkyl or alkoxy having from 1 to 3 carbon atoms, in particular $CF_3$, $OCF_3$, $CF_2H$ or $OCF_2H$, furthermore $OCH_3$ or $OC_2H_5$.

Preference is furthermore given to compounds of the formula I and their sub-formulae in which $Z^1$ and $Z^2$ are —OCO—, —COO—, —$CF_2O$—, —$OCF_2$—, —$CH_2CH_2$—, —$CF_2CF_2$— or a single bond.

Preference is furthermore given to compounds of the formula I and their sub-formulae in which R is alkyl or alkoxy having from 1 to 8 carbon atoms.

The compounds of the following sub-formulae are particularly preferred. In these, Cyc denotes a 1,4-cyclohexylene radical, which may also be substituted in the 1- and/or 4-position by F, Cl, CN or $CF_3$, Dio denotes a 1,3-dioxane-2,5-diyl radical, Phe denotes a 1,4-phenylene radical, which may be substituted in the 2-, 3- and/or 5-position by L. Z has one of the meanings indicated for $Z^1$ in the formula I. $InX^1X^2$ denotes an indan-2-yl radical in accordance with the formula I which is substituted in the 5-position by $X^1$ and in the 6-position by $X^2$. L, R, $X^1$ and $X^2$ are as defined in the formula I.

| | |
|---|---|
| R-Cyc-$Z^1$-InX$^1$X$^2$ | I1 |
| R-Phe-$Z^1$-InX$^1$X$^2$ | I2 |
| R-Dio-$Z^1$-InX$^1$X$^2$ | I3 |
| R-Cyc-$Z^2$-Phe-$Z^1$-InX$^1$X$^2$ | I4 |
| R-Cyc-$Z^2$-Cyc-$Z^1$-InX$^1$X$^2$ | I5 |
| R-Phe-$Z^2$-Cyc-$Z^1$-InX$^1$X$^2$ | I6 |
| R-Phe-$Z^2$-Phe-$Z^1$-InX$^1$X$^2$ | I7 |
| R-Cyc-$Z^2$-Dio-$Z^1$-InX$^1$X$^2$ | I8 |
| R-Dio-$Z^2$-Cyc-$Z^1$-InX$^1$X$^2$ | I9 |
| R-Dio-$Z^2$-Dio-$Z^1$-InX$^1$X$^2$ | I10 |
| R-Phe-$Z^2$-Dio-$Z^1$-InX$^1$X$^2$ | I11 |
| R-Dio-$Z^2$-Phe-$Z^1$-InX$^1$X$^2$ | I12 |
| R-Cyc-$Z^2$-Cyc-$Z^1$-Cyc-$Z^1$-InX$^1$X$^2$ | I13 |
| R-Cyc-$Z^2$-Cyc-$Z^1$-Phe-$Z^1$-InX$^1$X$^2$ | I14 |
| R-Phe-$Z^2$-Cyc-$Z^1$-Cyc-$Z^1$-InX$^1$X$^2$ | I15 |
| R-Cyc-$Z^2$-Phe-$Z^1$-Phe-$Z^1$-InX$^1$X$^2$ | I16 |
| R-Phe-$Z^2$-Phe-$Z^1$-Cyc-$Z^1$-InX$^1$X$^2$ | I17 |
| R-Phe-$Z^2$-Phe-$Z^1$-Phe-$Z^1$-InX$^1$X$^2$ | I18 |
| R-Cyc-$Z^2$-Cyc-$Z^1$-Dio-$Z^1$-InX$^1$X$^2$ | I19 |
| R-Dio-$Z^2$-Cyc-$Z^1$-Cyc-$Z^1$-InX$^1$X$^2$ | I20 |
| R-Cyc-$Z^2$-Dio-$Z^1$-Dio-$Z^1$-InX$^1$X$^2$ | I21 |
| R-Dio-$Z^2$-Dio-$Z^1$-Cyc-$Z^1$-InX$^1$X$^2$ | I22 |
| R-Dio-$Z^2$-Dio-$Z^1$-Dio-$Z^1$-InX$^1$X$^2$ | I23 |
| R-Dio-$Z^2$-Dio-$Z^1$-Phe-$Z^1$-InX$^1$X$^2$ | I24 |
| R-Dio-$Z^2$-Phe-$Z^1$-Phe-$Z^1$-InX$^1$X$^2$ | I25 |
| R-InX$^1$X$^2$ | I26 |

Particular preference is given to compounds of the sub-formulae I1, I2, I4, I5, I6 and I7 and I26.

Very particularly preferred compounds of the formula I are selected from the following sub-formulae Ia to Ie:

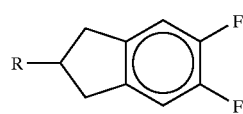

Ia

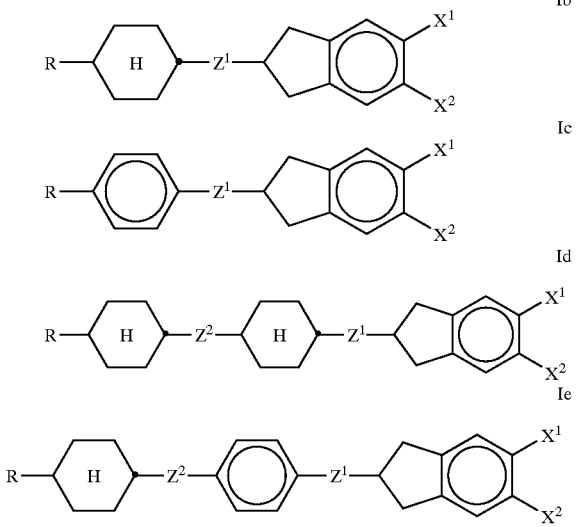

in which R, $Z^1$, $Z^2$, $X^1$ and $X^2$ are as defined in the formula I.

Particular preference is given to compounds of the formula Ia, Ib and Id, in particular those in which $X^1$ and $X^2$ are F, $Z^1$ is a single bond and R is alkyl or alkoxy having from 1 to 8 carbon atoms.

Preference is furthermore given to compounds of the formulae I and Ia to Id in which $X^1$ and $X^2$ are F, Cl, CN, $CF_3$, $OCF_3$, $CF_2H$ or $OCF_2H$,
one of the radicals $X^1$ and $X^2$ is F, CN, $C_1$, $CF_3$ or $OCF_3$ and the other is H or alkyl, alkoxy, alkylcarbonyl, alkoxycarbonyl or alkylcarbonyloxy having from 1 to 8 carbon atoms, $Z^1$ and $Z^2$ are a single bond,
one or both radicals $Z^1$ and $Z^2$ are $-CF_2O-$, $-OCF_2-$ or $-CF_2CF_2-$,
R is alkyl or alkoxy having from 1 to 8 carbon atoms.

The term "fluorinated alkyl or alkoxy having from 1 to 3 carbon atoms" is preferably $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_1$, particularly preferably $OCF_3$ or $OCF_2H$.

Halogen is preferably F or Cl, in particular F.

If R is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkyl radical in which one $CH_2$ group has been replaced by $-CH=CH-$, this may be straight-chain or branched. It is preferably straight-chain and has from 2 to 10 carbon atoms. Accordingly, it is in particular vinyl, prop-1- or -2-enyl, but-1-, -2- or -3-enyl; pent-1-, -2-, -3- or 4-enyl, hex-1-, -2-, -3-, 4- or -5-enyl, hept-1-, -2-, -3-, 4-, -5- or 4-enyl, oct-1-, -2-, -3-, 4-, -5-, -6- or -7-enyl, non-1-, -2-, -3-, 4-, -5-, -6-, -7- or -8-enyl, or dec-1-, -2-, -3-, 4-, -5-, -6-, -7-, -8- or -9-enyl.

If R is an alkyl radical in which one $CH_2$ group has been replaced by $-O-$ and one has been replaced by $-CO-$, these are preferably adjacent. These thus contain an acyloxy group $-CO-O-$ or an oxycarbonyl group $-O-CO$. These are preferably straight chain and have from 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)-propyl, 3-(ethoxycarbonyl)propyl or 4-(methoxycarbonyl)butyl.

If R is an alkyl radical in which one $CH_2$ group has been replaced by unsubstituted or substituted $-CH=CH-$ and an adjacent $CH_2$ group has been replaced by CO or $CO-O$ or $O-CO$, this may be straight-chain or branched. It is preferably straight-chain and has from 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyt, 8-acryloyloxybctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl; or 9-methacryloyloxynonyl.

If R is an alkyl or alkenyl radical which is monosubstituted by CN or $CF_3$, this radical is preferably straight-chain. The substitution by CN or $CF_3$ is in any desired position.

If R is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the co-position.

Compounds of the formula I which have wing groups R which are suitable for polymerisation reactions are suitable for the preparation of liquid-crystalline polymers.

Compounds containing branched wing groups R may occasionally be of importance owing to better solubility in the conventional liquid-crystalline base materials, but in particular as chiral dopants if they are optically active. Smectic compounds of this type are suitable as components of ferroelectric materials.

Compounds of the formula I having SA phases are suitable for thermally addressed displays.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If R is an alkyl radical in which two or more $CH_2$ groups have been replaced by $-O-$ and/or $-CO-O-$, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)-ethyl, 3,3-bis(methoxycarbonyl)propyl, 4,4-bis(methoxycarbonyl) butyl, 5,5-bis(methoxycarbonyl)pentyl, 6,6-bis(methoxycarbonyl)hexyl, 7,7-bis-(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)-propyl, 4,4-bis(ethoxycarbonyl)butyl or 5,5-bis(ethoxycarbonyl)hexyl.

The invention also relates to electro-optical displays containing liquid-crystal media according to the invention, in particular TN, STN, OCB, IPS or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell. The invention furthermore relates to the use of the liquid-crystal media according to the invention for electro-optical use.

The liquid-crystal mixtures according to the invention enable a significant widening of the available parameter latitude. The achievable combinations of clearing point, viscosity at low temperature, thermal and UV stability and dielectric anisotropy are thus far superior to previous materials from the prior art.

The requirement for a high clearing point, a nematic phase at low temperature, high Δε and at the same time low viscosity has hitherto only been achieved to an inadequate extent. Although mixtures known hitherto have relatively high values for the clearing point and for Δε as well as favourable birefringence, they still have inadequately low values for the rotational viscosity $\gamma_1$.

Other mixture systems have comparable viscosities and Δε values, but only have clearing points in the region of 60° C.

The liquid-crystal mixtures according to the invention, while retaining the nematic phase down to −20° C. and preferably down to −30° C., particularly preferably down to −40° C., enable clearing points above 75° C., preferably above 80° C., particularly preferably above 85° C., simultaneously dielectric anisotropy values Δε of ≧5, preferably ≧7, and a high value for the specific resistance to be achieved, enabling excellent STN and MLC displays to be obtained. In particular, the mixtures are characterised by low operating voltages. The TN thresholds are <2.0 V, preferably 1.8 V, particularly preferably <1.6 V, very particularly preferably <1.4 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater Δε and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975] are used, where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The rotational viscosity $\gamma_1$ at 20° C. is preferably <160 mPa·s, particularly preferably <140 mpa·s. The nematic phase range is preferably at least 90°, in particular at least 100°. This range preferably extends at least from −20° to +80.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenyl-cyclohexanes of the formula

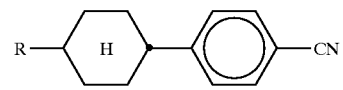

or esters of the formula R

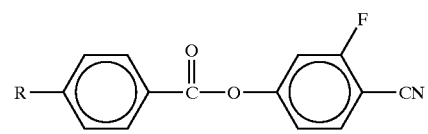

instead of the compounds of the formula I.

In addition, it has been found that mixtures according to the invention comprising compounds of the formula I have a higher clearing point and higher Δε than analogous mixtures comprising cyanophenylcyclohexanes of the above-mentioned formula. Compared with the last-mentioned mixtures, the mixtures according to the invention also have a smaller Δn, which is advantageous for many applications, in particular reflective and transflective applications.

The UV stability of the mixtures according to the invention is also considerably better, i.e. they exhibit a significantly smaller decrease in the HR on exposure to UV.

The proportion of the compounds of the formula I in the mixture of the media according to the invention as a whole is preferably 2–55%, preferably 3–35% and particularly preferably 5–15%.

The individual compounds of the following formulae and their sub-formulae which can be used in the media according to the invention are either known or can be prepared analogously to the known compounds.

Preferred embodiments are indicated below:

The medium additionally comprises one or more compounds selected from the group consisting of the general formulae II to VII:

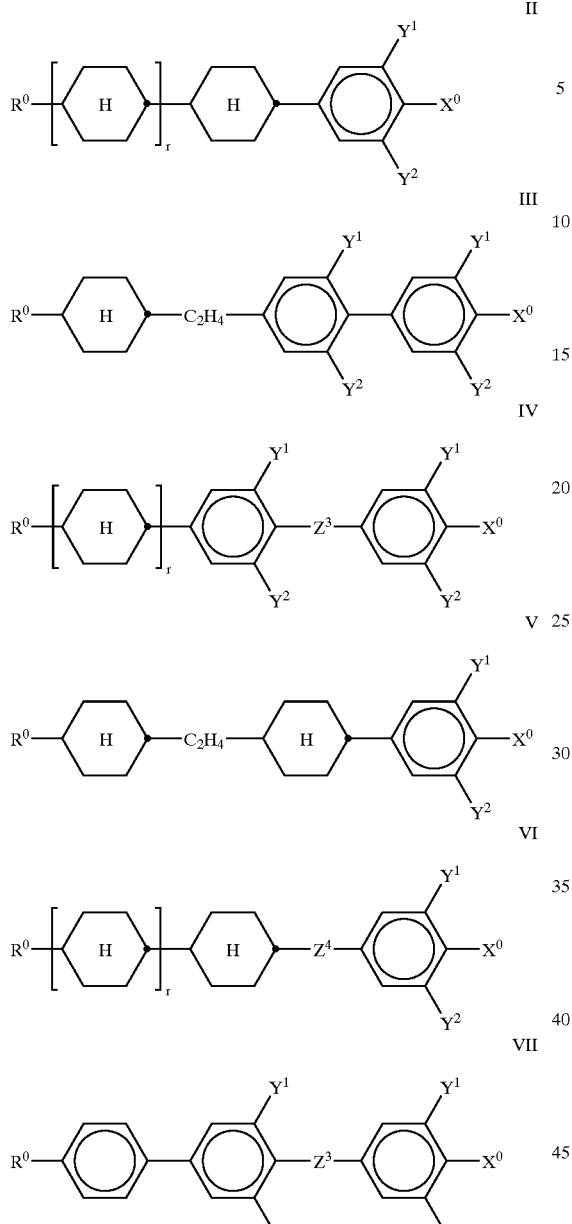

in which the individual radicals have the following meanings:

$R^0$ is n-alkyl, alkoxy, fluoroalkyl, alkenyl or oxaalkenyl, each having up to 9 carbon atoms, $Z^3$ is —COO—, —CF$_2$O—, —C$_2$F$_4$— or a single bond, $Z^4$ is —COO, —CF$_2$O—, —C$_2$F$_4$— or —C$_2$H$_4$—, $X^0$ is F, Cl, halogenated alkyl, alkenyl or alkoxy having up to 6 carbon atoms, $Y^1$ and $Y^2$ are each, independently of one another, H or F, and r is 0 or 1.

The compounds of the formula II are preferably selected from the following group:

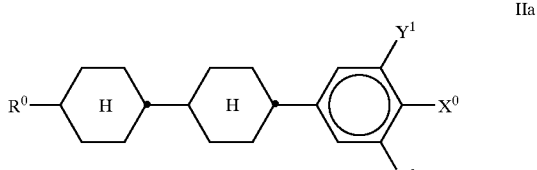

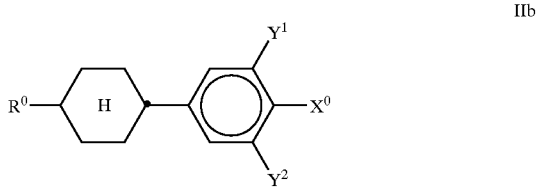

in which $R^0$ and $X^0$ are as defined above, $R^0$ is particularly preferably n-alkyl having from 1 to 8 carbon atoms or alkenyl having from 2 to 7 carbon atoms, and $X^0$ is particularly preferably F, Cl, CF$_3$, OCF$_3$ or OCHF$_2$;

The compounds of the formula IV are preferably selected from the following group:

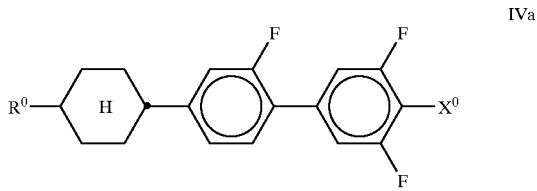

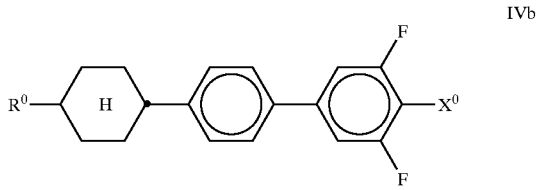

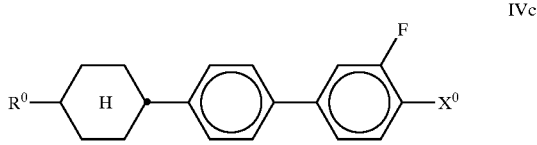

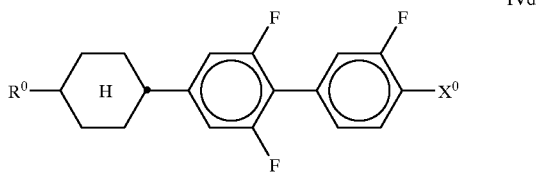

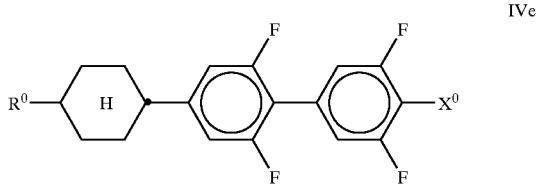

IVf
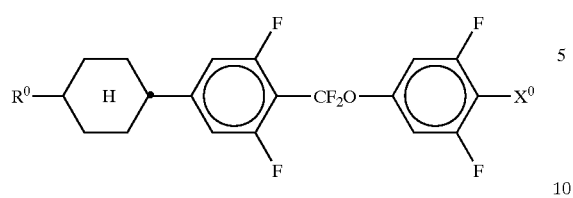

IVg
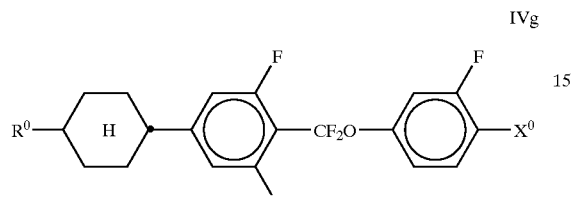

IVh
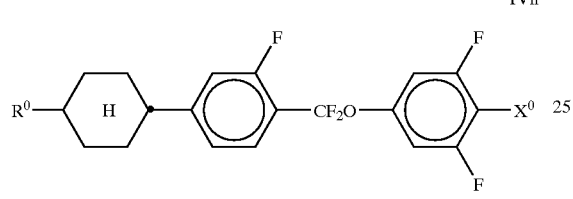

IVi
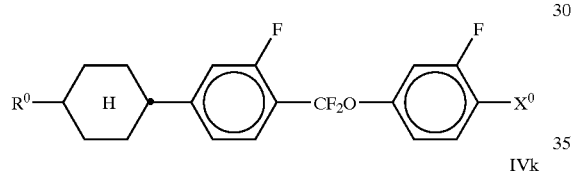

IVk
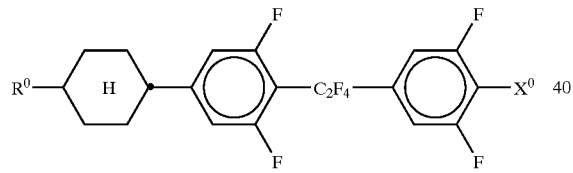

IVl
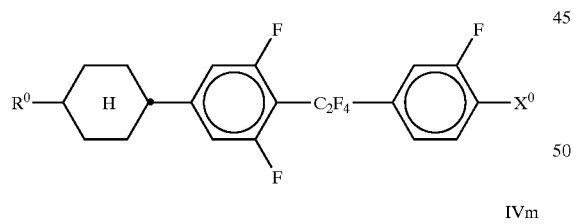

IVm
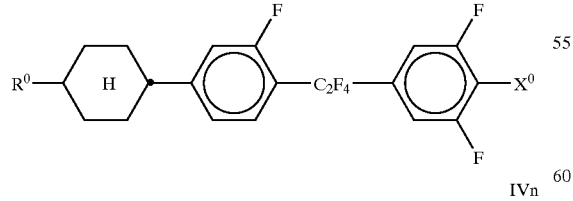

IVn
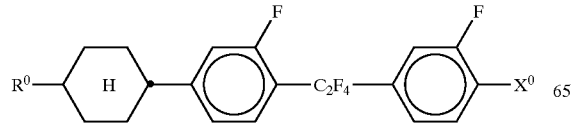

IVo
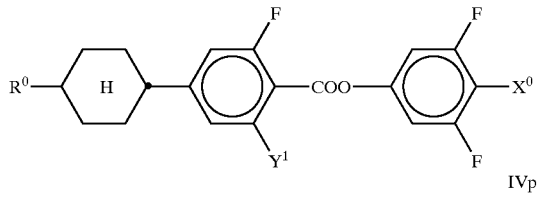

IVp
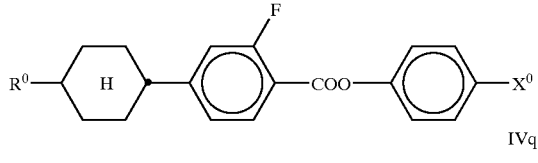

IVq
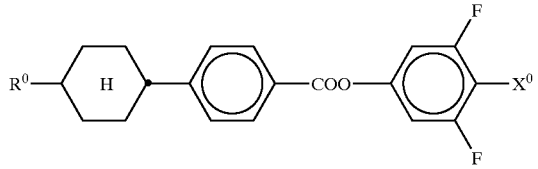

in which $R^0$, $X^0$ and $Y^1$ are as defined above. $R^0$ is particularly preferably n-alkyl having from 1 to 8 carbon atoms or alkenyl having from 2 to 7 carbon atoms. $X^0$ is particularly preferably $OCF_3$, $OCHF_2$ or F. Particular preference is given to compounds of the formulae IVa, IVb, IVc, IVd and IVp;

The compounds of the formula VI are preferably selected from the following group:

VIa
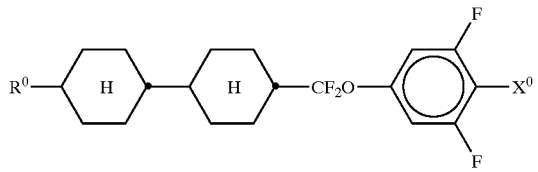

VIb
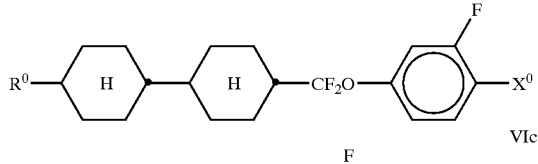

VIc
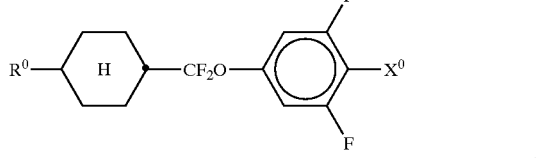

VId
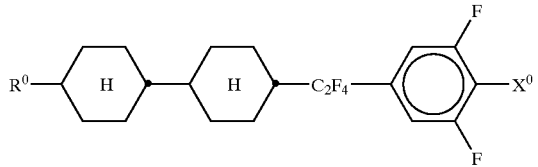

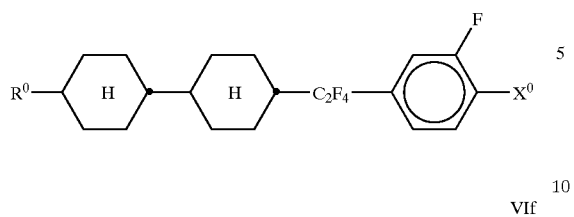

VIe

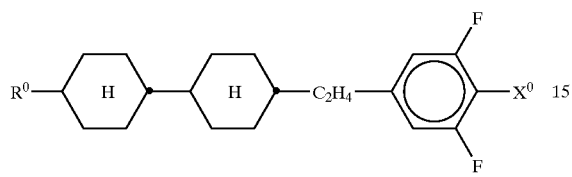

VIf

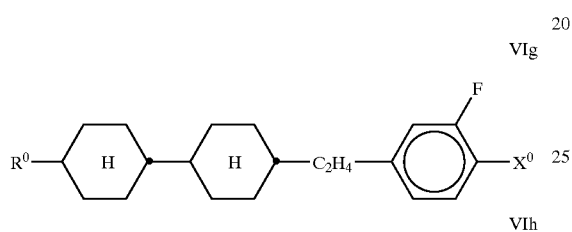

VIg

VIh

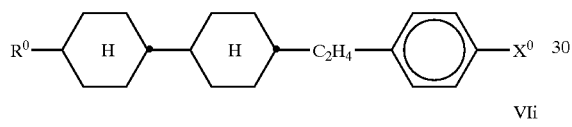

VIi

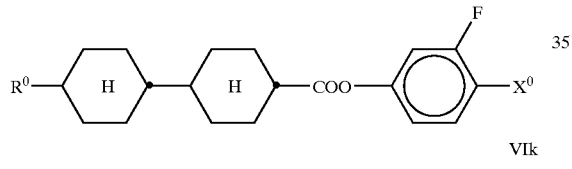

VIk

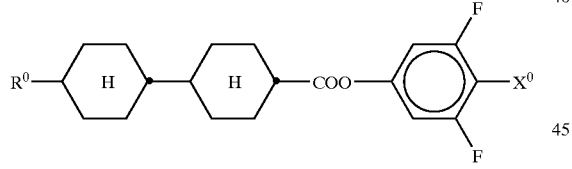

in which $R^0$ and $X^0$ are as defined above. $R^0$ is particularly preferably n-alkyl having from 1 to 8 carbon atoms or alkenyl having from 2 to 7 carbon atoms. $X^0$ is preferably $OCF_3$, $OCHF_2$ or F. Particular preference is given to compounds of the formulae VIa, VIb, VIc, VIh, VIi and VIk;

The compounds of the formula VII are preferably selected from the following group:

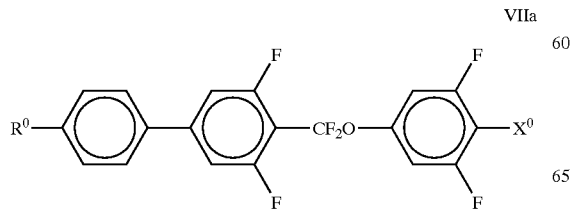

VIIa

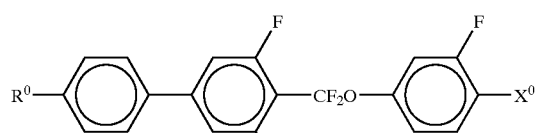

VIIb

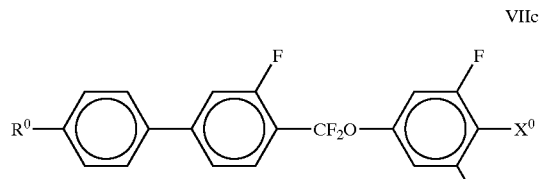

VIIc

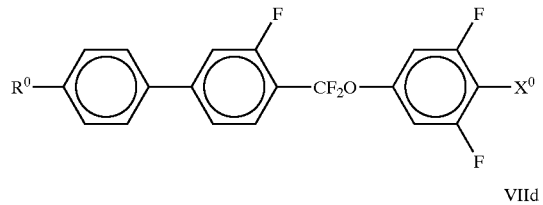

VIId

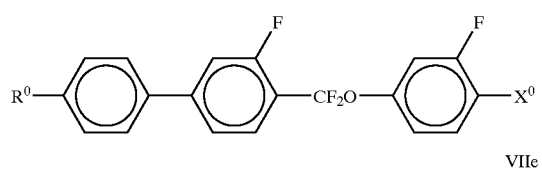

VIIe

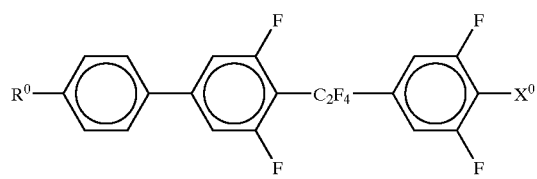

VIIf

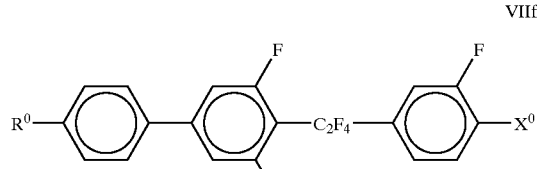

VIIg

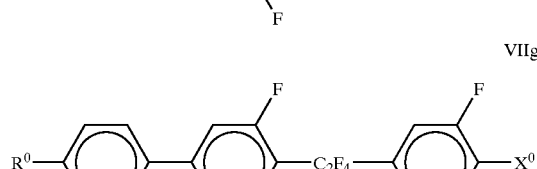

VIIh

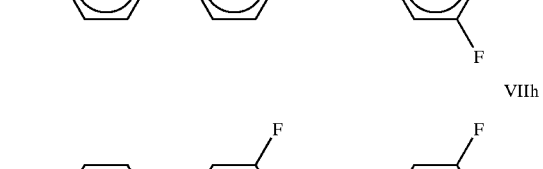

VIIi

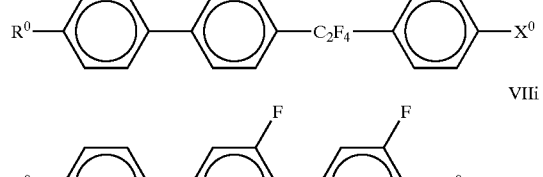

in which $R^0$ and $X^0$ are as defined above. $R^0$ is particularly preferably n-alkyl having from 1 to 8 carbon atoms or alkenyl having from 2 to 7 carbon atoms. $X^0$ is preferably $OCF_3$ or F, particularly preferably F. Particular preference is given to the compounds of the formulae VIIa and VIIb;

The medium additionally comprises one or more compounds selected from the following group:

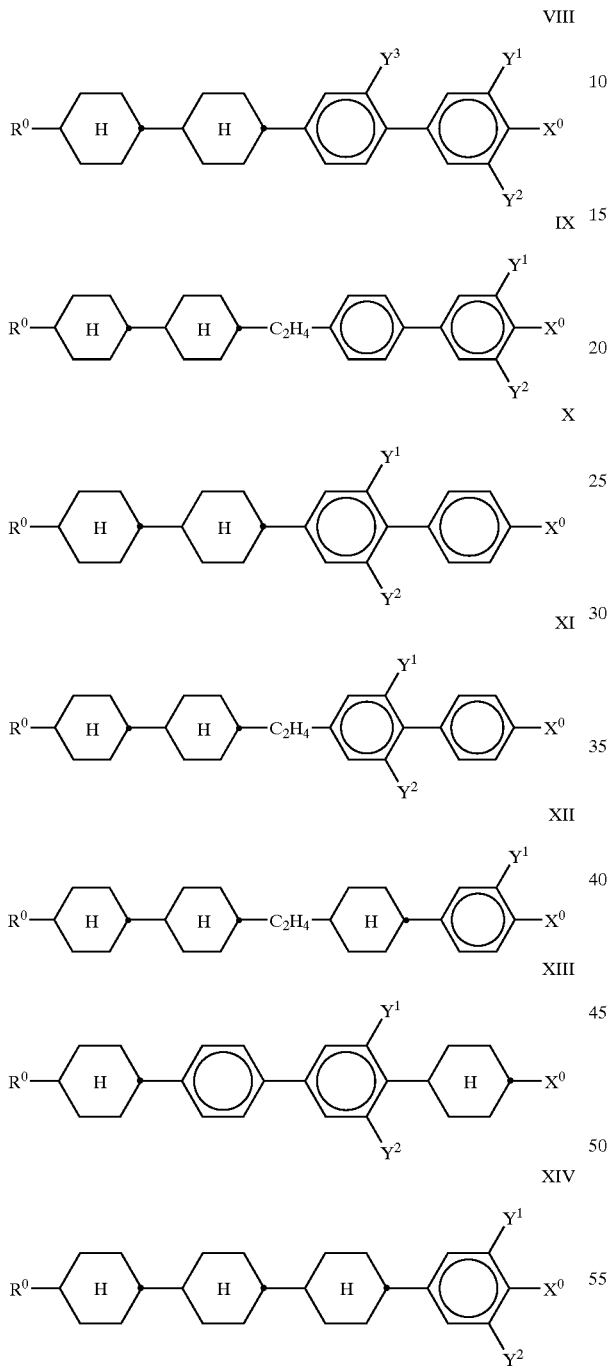

in which $R^0$, $X^0$, $Y^1$ and $Y^2$ each, independently of one another, have one of the meanings indicated above. $Y^3$ is H or F, and $X^0$ is preferably F, Cl, $CF_3$, $OCF_3$, $OCHF_2$, alkyl, oxaalkyl, fluoroalkyl or alkenyl, each having up to 6 carbon atoms.

Particular preference is given to compounds of the formula VIII, in particular those in which $Y^1$, $Y^2$, $Y^3$ and $X^0$ are F.

The medium comprises further compounds, preferably selected from the following group:

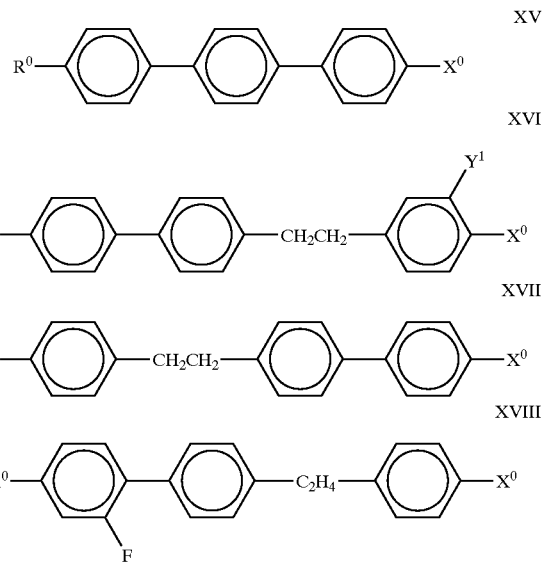

in which $R^0$ and $X^0$ are as defined above, and the 1,4-phenylene rings may be substituted by CN, chlorine or fluorine. The 1,4-phenylene rings are preferably monosubstituted or polysubstituted by fluorine atoms. In the compound XVIII, $X^0$ is particularly preferably F or Cl.

The medium additionally comprises one or more compounds selected from the following group:

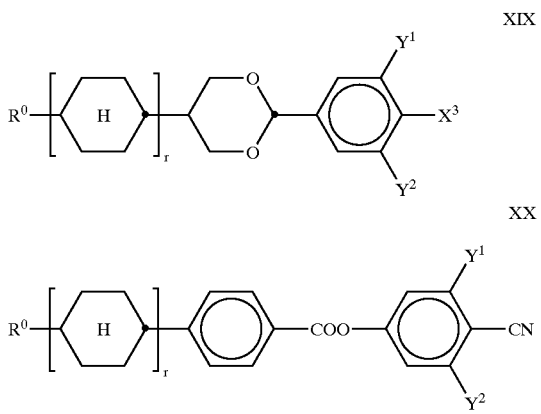

in which $X^3$ has one of the meanings of $X^0$ or is CN or NCS, and $R^0$, $X^0$, $Y^1$, $Y^2$ and r are as defined above.

Particularly preferred sub-formulae from the group consisting of the compounds of the formulae XIX and XX are the following:

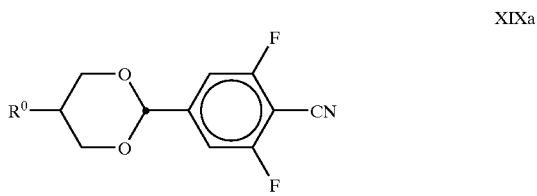

XIXb

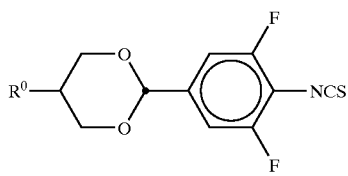

XXa

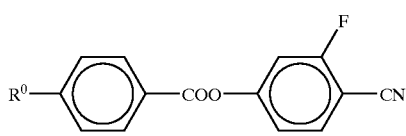

XXb

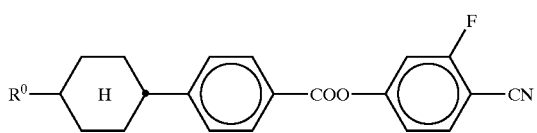

in which $R^0$ is as defined above and is particularly preferably n-alkyl having from 1 to 8 carbon atoms or alkenyl having from 2 to 7 carbon atoms.

The medium preferably comprises one or more dioxanes of the formulae D1 and D2:

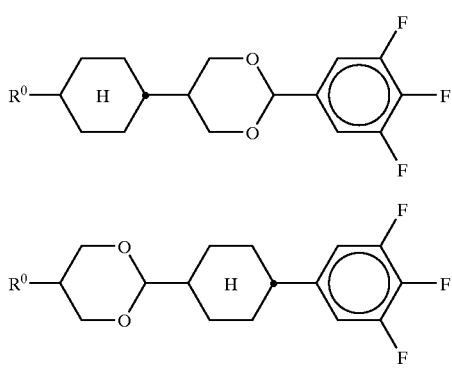

in which $R^0$ is as defined above.

The medium additionally comprises one or more compounds selected from the following group:

XXI

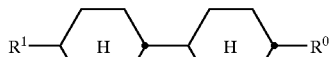

XXII

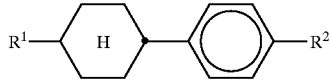

XXIII

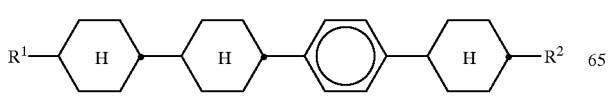

XXIV

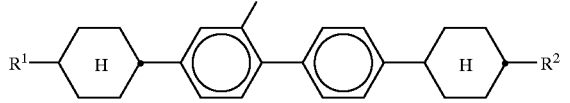

XXV

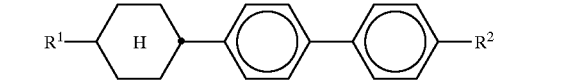

XXVI

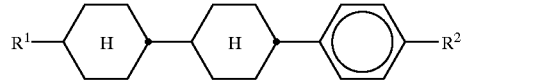

XXVII

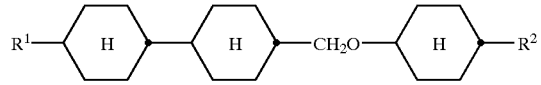

in which $R^0$ and $Y^1$ are as defined above, and $R^1$ and $R^2$ are each, independently of one another, alkyl or alkoxy having from 1 to 8 carbon atoms or alkenyl having from 2 to 7 carbon atoms.

In the compounds of the formulae XXII to XXVII, $R^1$ and $R^2$ are preferably alkyl or alkoxy having from 1 to 8 carbon atoms.

Particular preference is given to the compounds selected from the following group:

XXIa

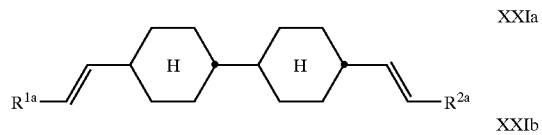

XXIb

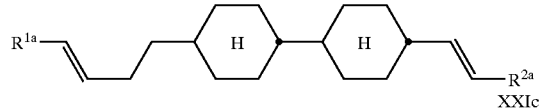

XXIc

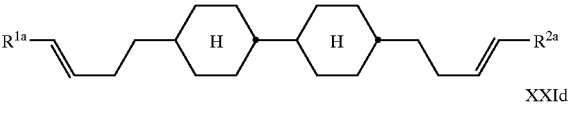

XXId

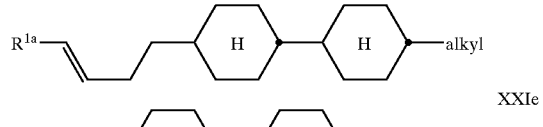

XXIe

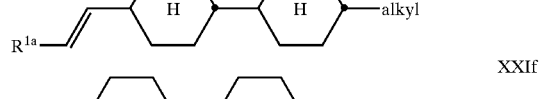

XXIf

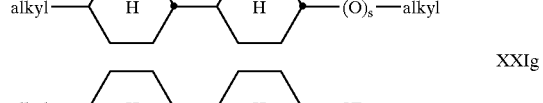

XXIg

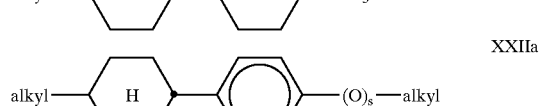

XXIIa

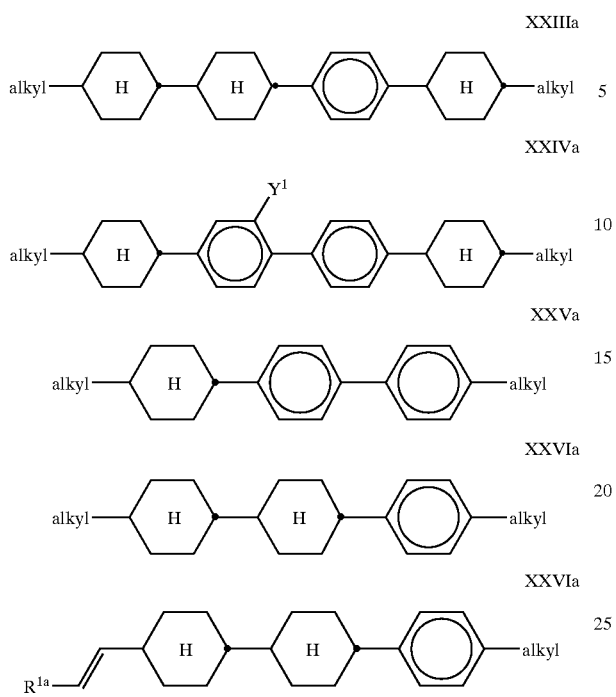

in which $R^{1a}$ and $R^{2a}$ are each, independently of one another, H, $CH_3$, $C_2H_5$ or n—$C_3H_7$, alkyl is an alkyl group having from 1 to 7 carbon atoms, s is 0 or 1 and L is H, or F.

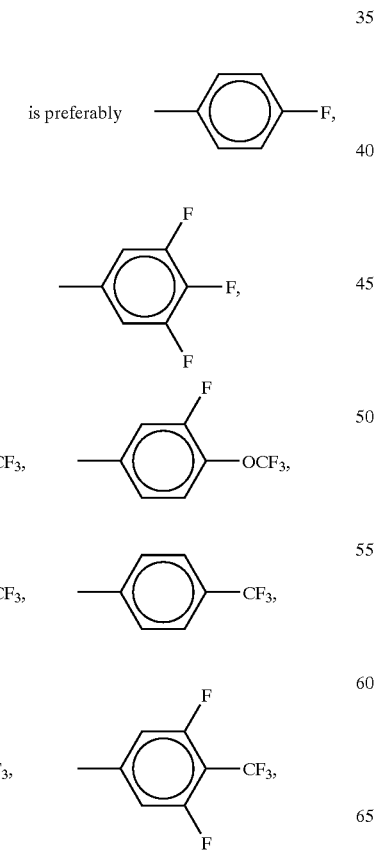

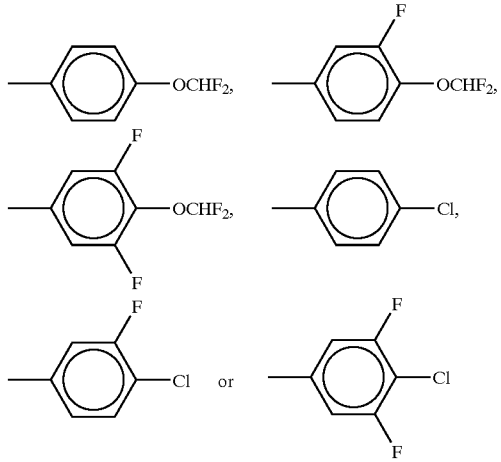

$R^0$ is straight-chain alkyl or alkenyl having from 2 to 7 carbon atoms;

The medium comprises compounds selected from the formulae II, III, IV, V, VI, VII, VIII, XIX, XX, XXI, XXII, XIII, XXIV and XXVII;

The medium comprises one or more compounds selected from the formulae IIa, IIb, IVa, IVb, IVc, IVd and VIk in which $X^0$ is F, The medium comprises one or more compounds selected from the formulae IIa, IVp, VIh and VIi in which $X^0$ is $OCF_3$ or $OCHF_2$, The I: (II+III+IV+V+VI+VII) weight ratio is preferably from 1:10 to 10:1;

The medium essentially consists of compounds selected from the group consisting of the general formulae I to VIII and XIX to XXIV;

The medium comprises one, two or three compounds of the formula 1, preferably selected from the formulae Ia and Ic;

The proportion of compounds of the formula I in the mixture as a whole is from 2 to 55% by weight, in particular from 3 to 35% by weight, very particularly preferably from 5 to 15% by weight;

The proportion of compounds of the formulae I to VII together in the mixture as a whole is at least 50% by weight;

The proportion of compounds of the formulae II to VII and XIX to XXVII in the mixture as a whole is from 30 to 95% by weight.

It has been found that even a relatively small proportion of compounds of the formula I mixed with conventional liquid-crystal materials, but in particular with one or more compounds of the formulae II, III, IV, V, VI and/or VII, results in a significant lowering of the threshold voltage and in low birefringence values, with broad nematic phases with low smectic-nematic transition temperatures being observed at the same time, improving the shelf life. Particular preference is given to mixtures which, besides one or more compounds of the formula I, comprise one or more compounds of the formula IV, in particular compounds of the formula IVa, IVb, IVc and IVd in which $X^0$ is F or $OCF_3$. The compounds of the formulae I to VII are colourless, stable and readily miscible with one another and with other liquid-crystalline materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 0.2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably=1 and m is preferably from 1 to 6.

Through a suitable choice of the meanings of $R^0$ and $X^0$, the addressing times, the threshold voltage, the steepness of the transmission characteristic lines, etc., can be modified in the desired manner. For example, 1 E-alkenyl radicals, 3E-alkenyl radicals, 2E-alkenyloxy radicals and the like generally result in shorter addressing times, improved nematic tendencies and a higher ratio of the elastic constants $K_3$ (bend) and $K_1$ (splay) compared with alkyl or alkoxy radicals. 4-alkenyl radicals, 3-alkenyl radicals and the like generally give lower threshold voltages and smaller values of $K_3/K_1$ compared with alkyl and alkoxy radicals.

A —$CH_2CH_2$ group generally results in higher values of $K_3/K_1$ compared with a single covalent bond. Higher values of $K_3/K_1$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+IV+V+VI+VII depends substantially on the desired properties, on the choice of the components of the formulae 1, II, III, IV, V, VI and/or VII, and the choice of any other components that may be present. Suitable mixing ratios within the range given above can easily be determined from case to case.

The total amount of compounds of the formulae I to XXVII in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae I to XXVII.

In a particularly preferred embodiment, the media according to the invention comprise compounds of the formulae II to VII (preferably II, III and/or IV, in particular IVa) in which $X^0$ is F, $OCF_3$, $OCHF_2$, F, OCH=$CF_2$, OCF=$CF_2$ or $OCF_2$—$CF_2H$. A favourable synergistic effect with the compounds of the formula I results in particularly advantageous properties. In particular, mixtures comprising compounds of the formula I and of the formula IVa, IVb, IVc and IVd are distinguished by their low threshold voltages.

The construction of the MLC display according to the invention from polarisers, electrode base plates and surface-treated electrodes corresponds to the conventional construction for displays of this type. The term, "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

In the following examples, C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index. $\Delta\epsilon$ denotes the; dielectric anisotropy ($\Delta\epsilon=\epsilon_\parallel-\epsilon_\perp$, where $\epsilon_{81}$ denotes the dielectric constant parallel to the longitudinal molecular axes and $\epsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. $\gamma_1$ denotes the rotational viscosity.

The above-mentioned data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$, are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |

-continued
| Code for $R^1$, $R^2$, $L^1$, $L^2$ | $R^1$ | $R^2$ | $L^1$ | $L^2$ |
|---|---|---|---|---|
| rEsN | $C_rH_{2r+1}$—O—$C_2H_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |
Preferred mixture components are given in Tables A and B.
TABLE A
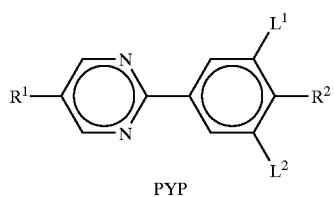
PYP
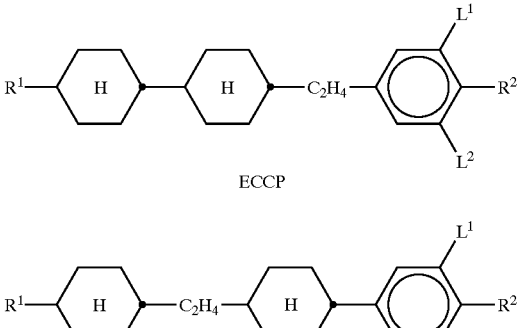
PYRP
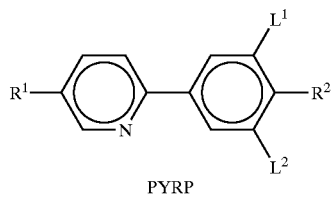
BCH
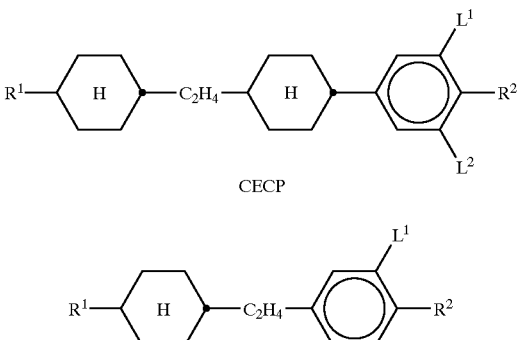
CBC
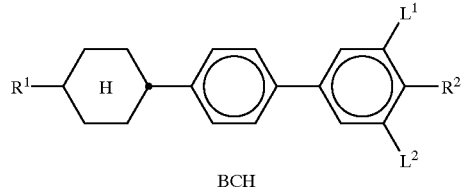
CCH
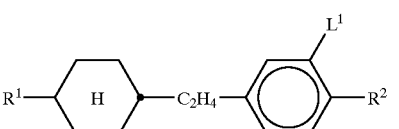
CCP
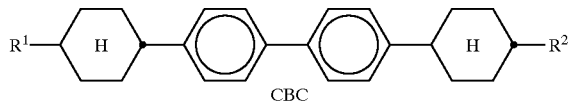
CPTP
TABLE A-continued
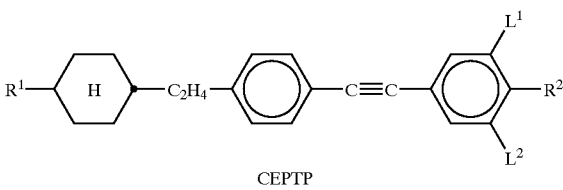
CEPTP
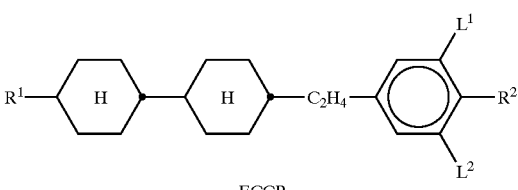
ECCP
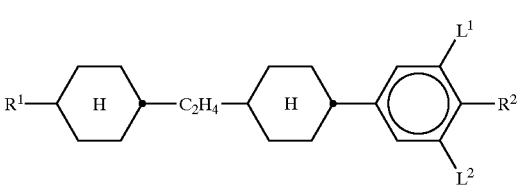
CECP
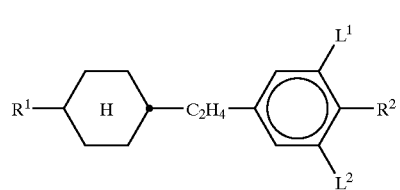
EPCH
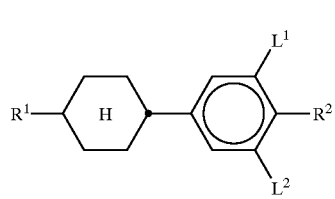
PCH
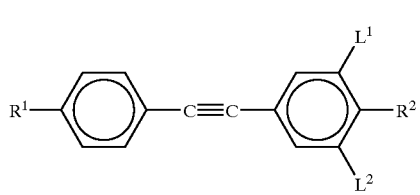
PTP
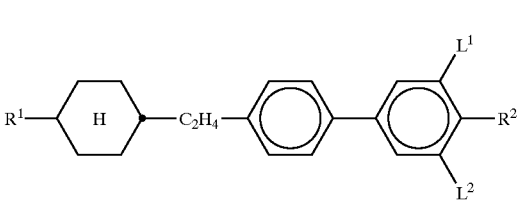
BECH
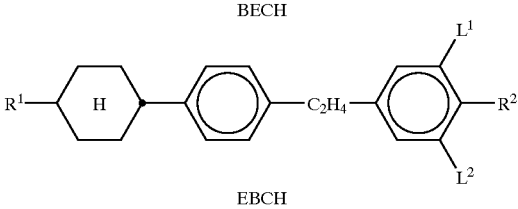
EBCH TABLE A-continued
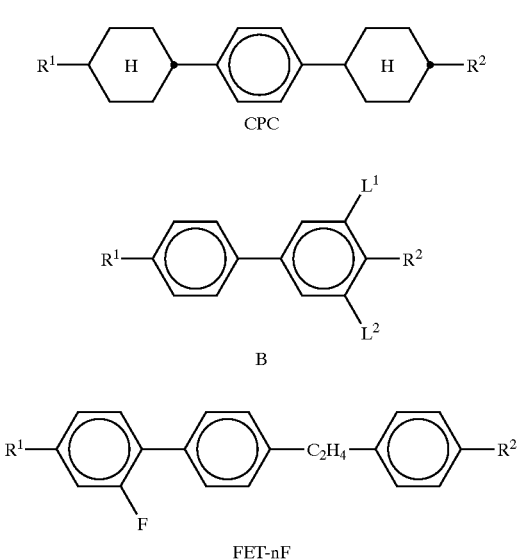
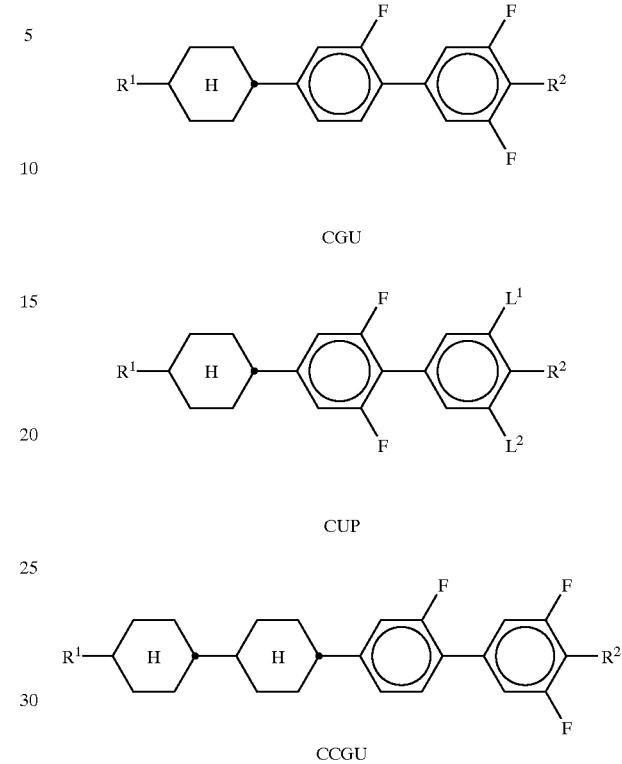
TABLE B
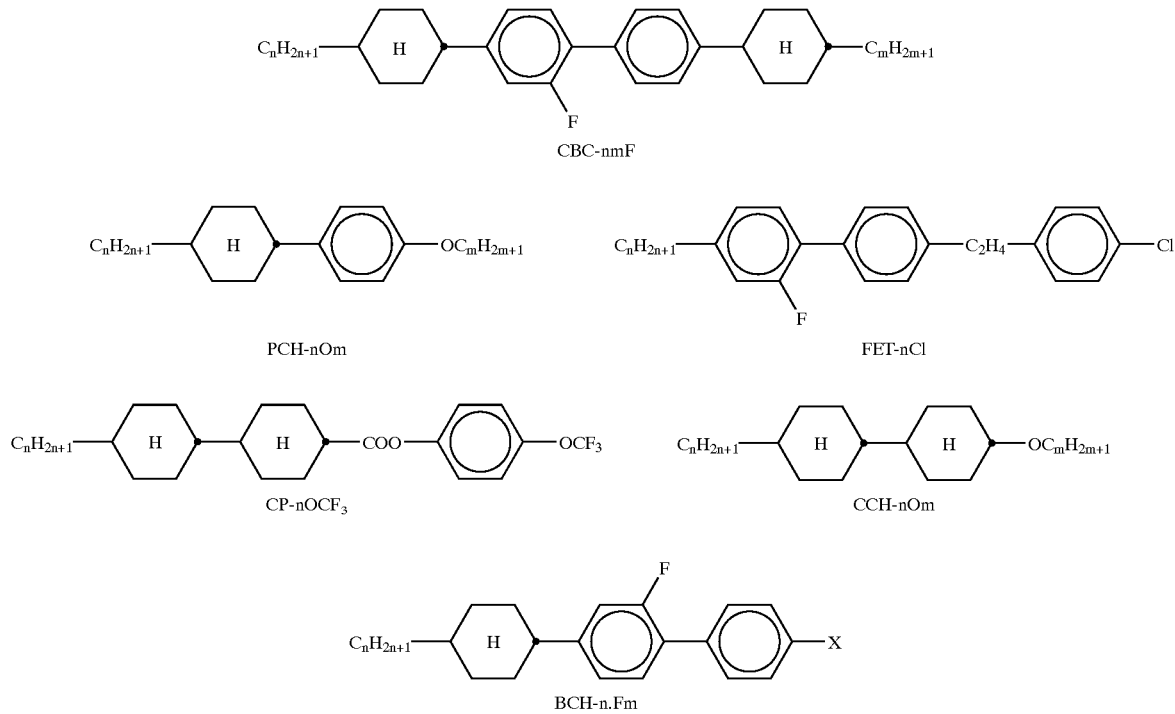

TABLE B-continued
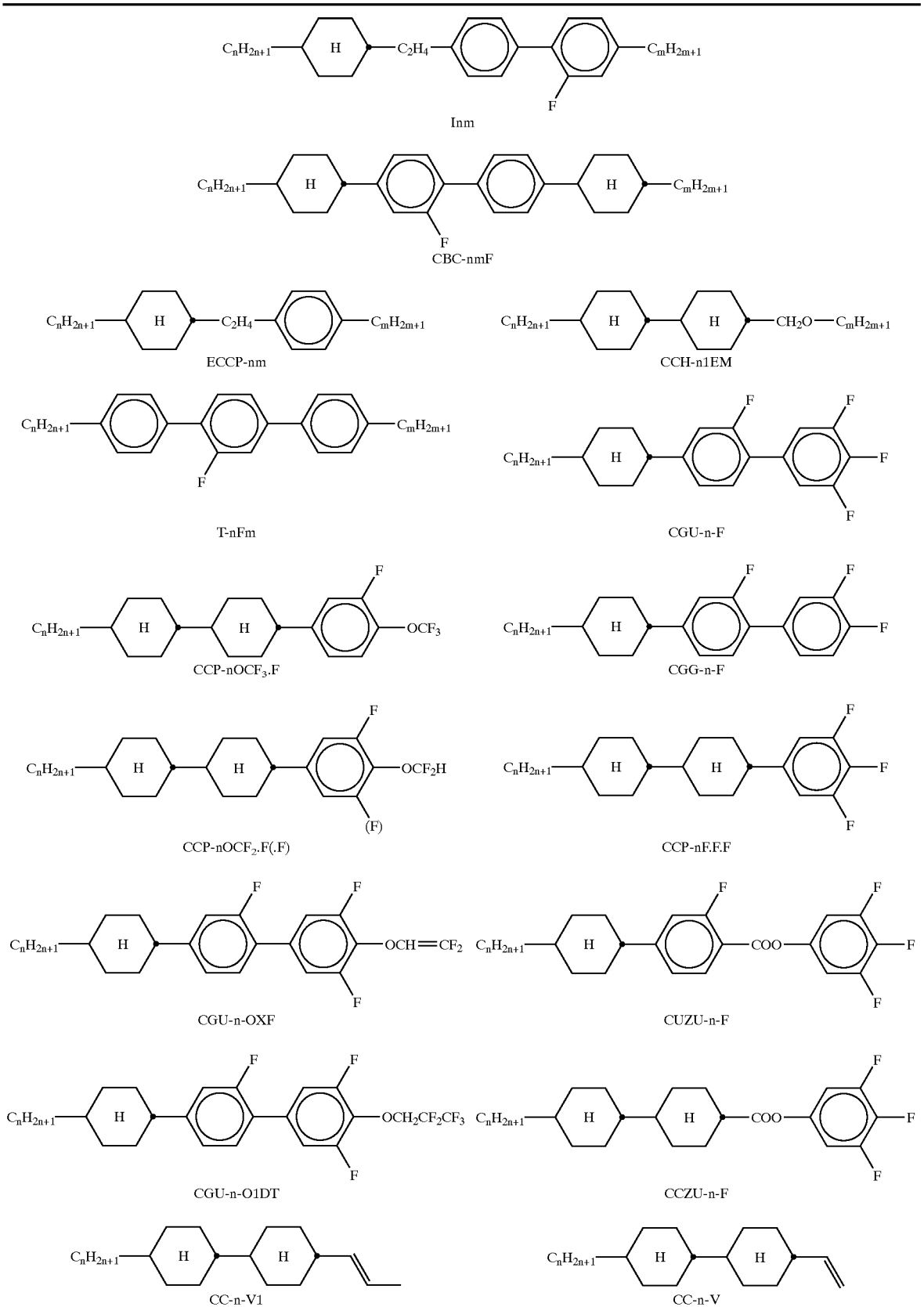

TABLE B-continued
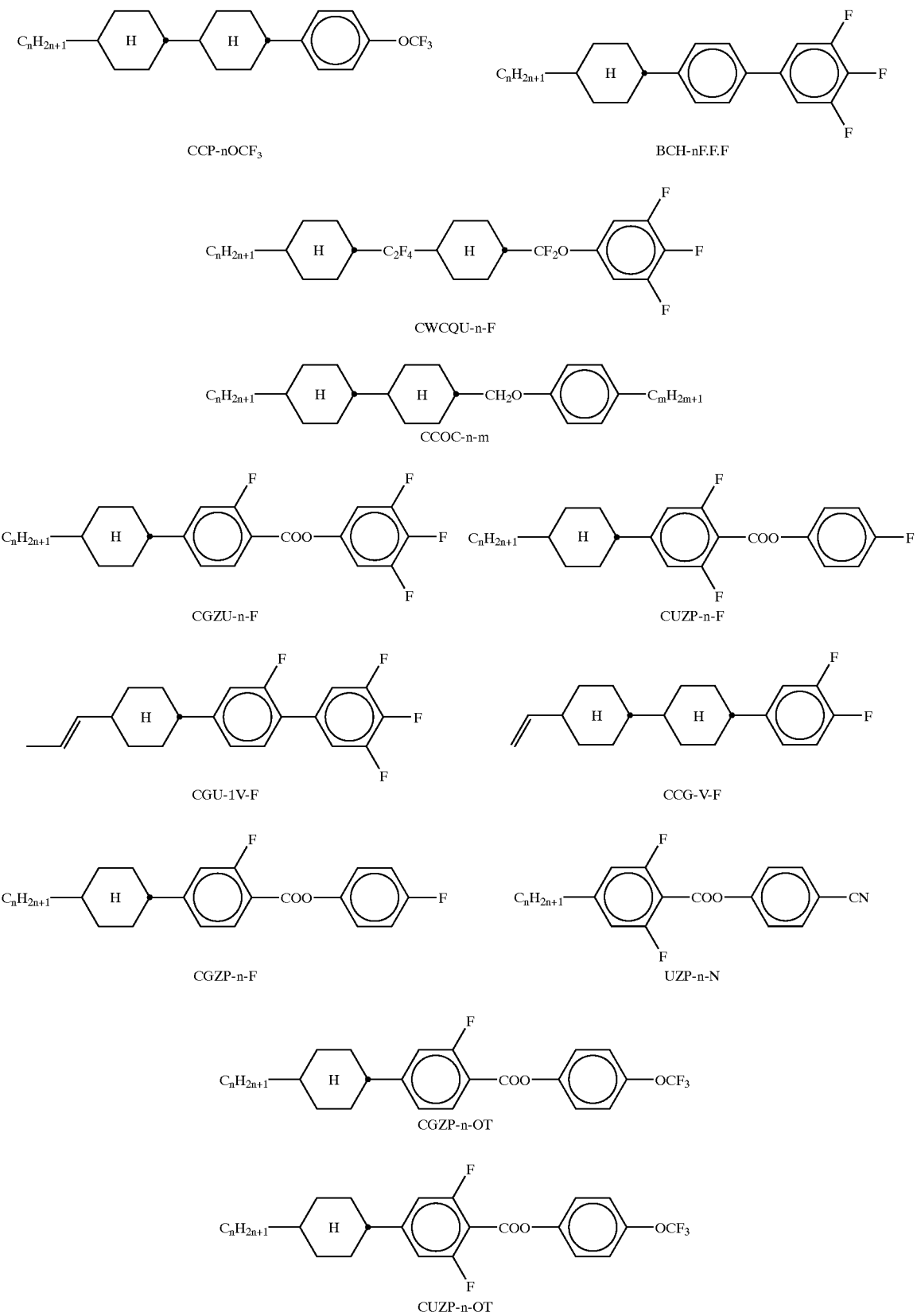

TABLE B-continued
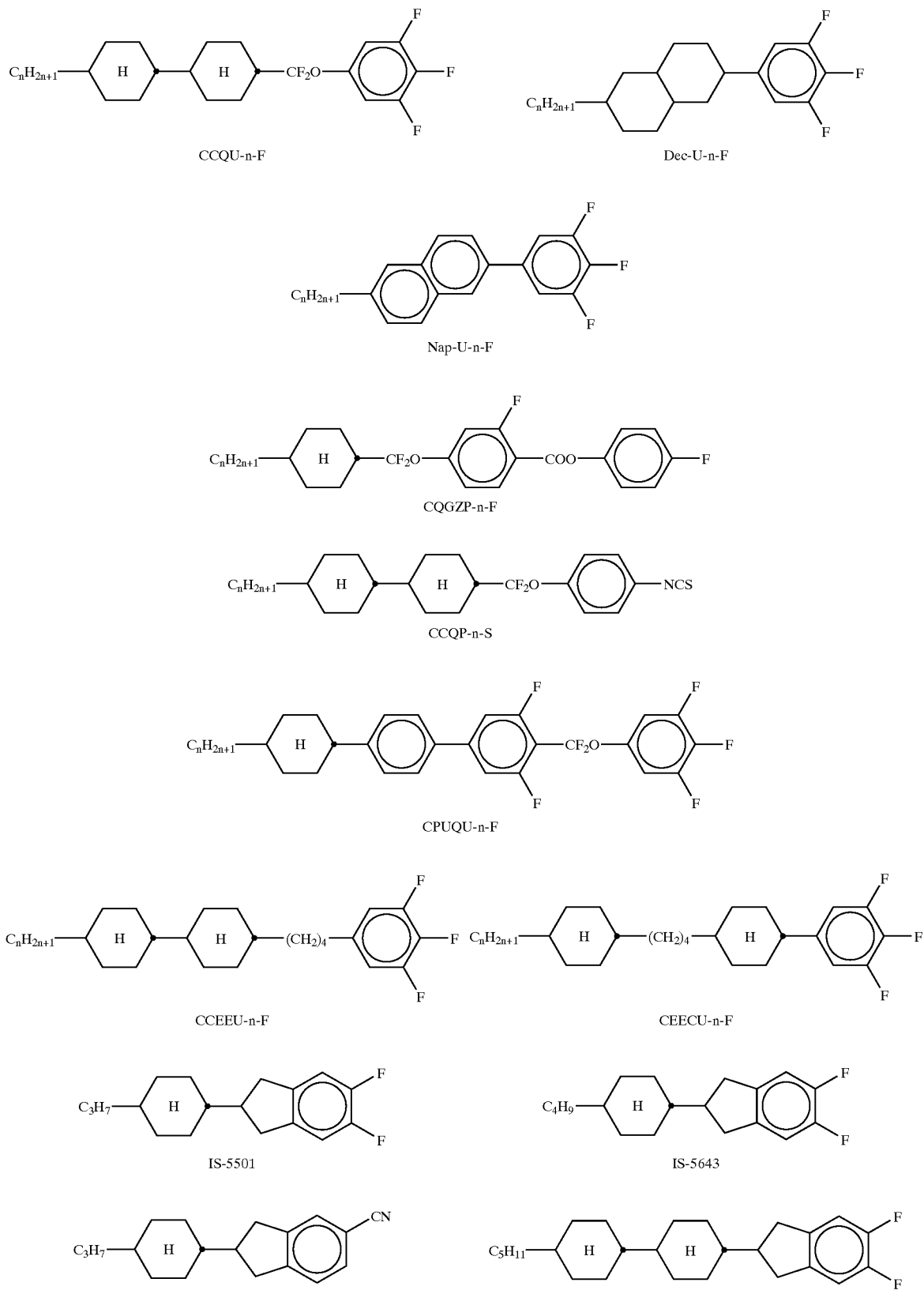

TABLE B-continued
IS-5930 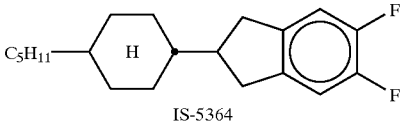
IS-5570 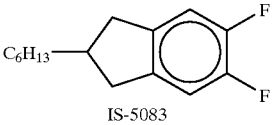
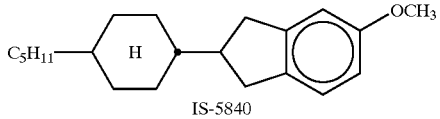
TABLE C
Table C indicates possible dopants which are generally added to the mixtures according to the invention.
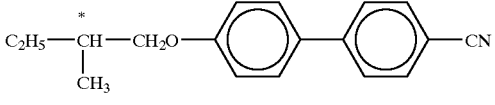
TABLE C-continued
Table C indicates possible dopants which are generally added to the mixtures according to the invention.

TABLE D
Stabilisers which can be added, for example, to the mixtures according to the invention are shown below.
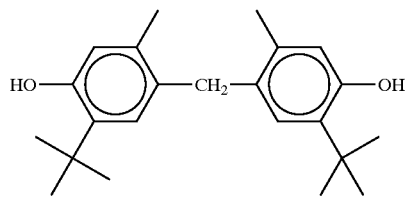
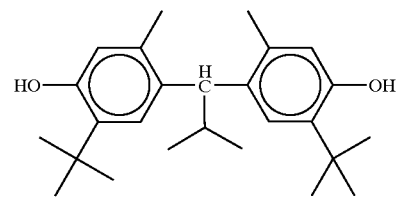
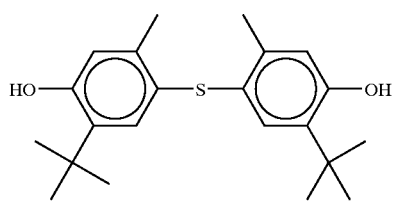
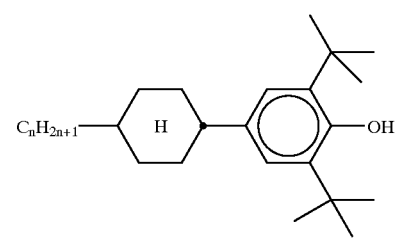
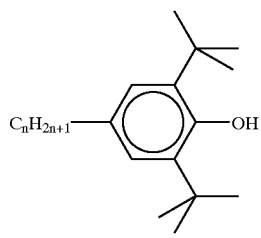
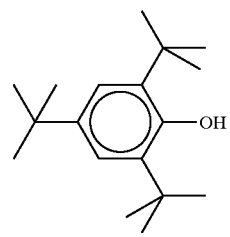
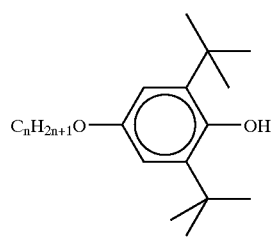
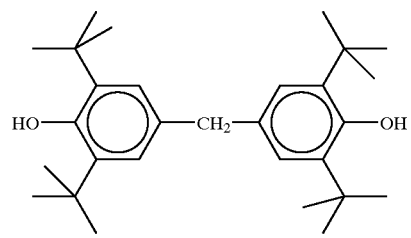
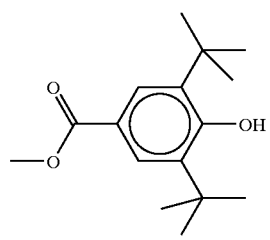
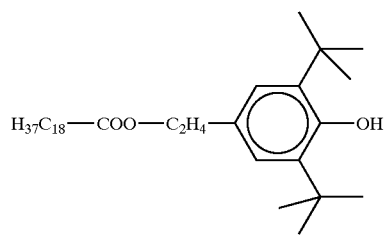

TABLE D-continued
Stabilisers which can be added, for example, to the mixtures according to the invention are shown below.
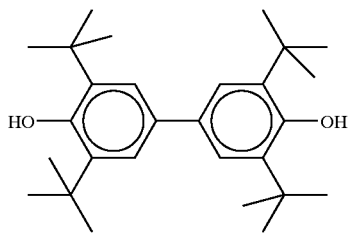
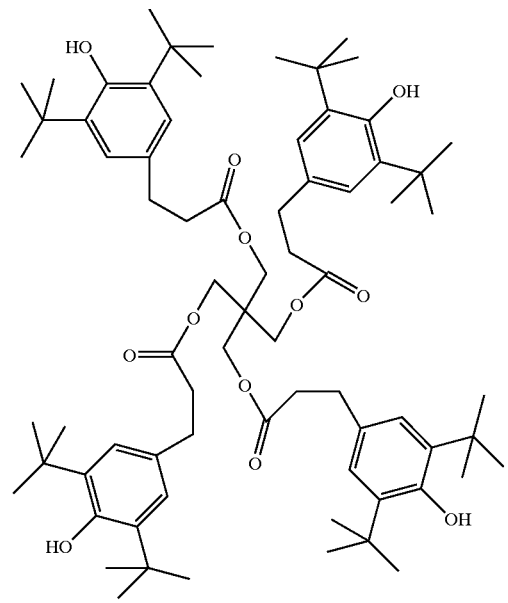
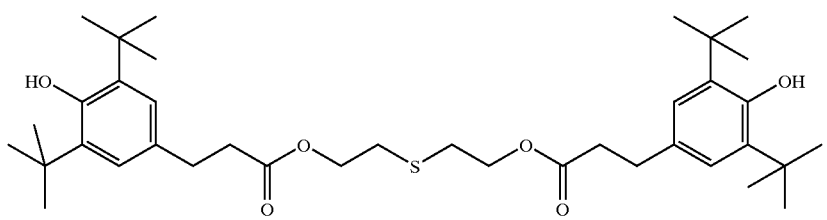
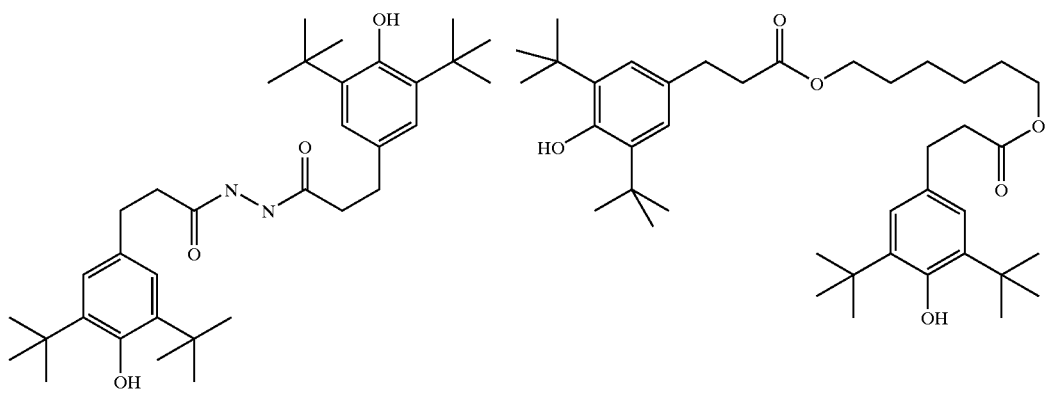

TABLE D-continued
Stabilisers which can be added, for example, to the mixtures according to the invention are shown below.
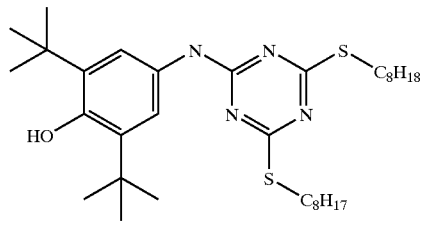
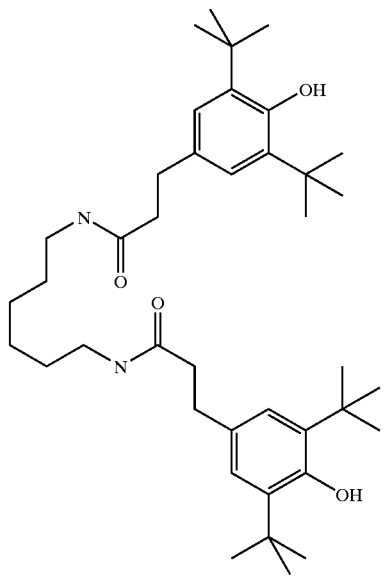
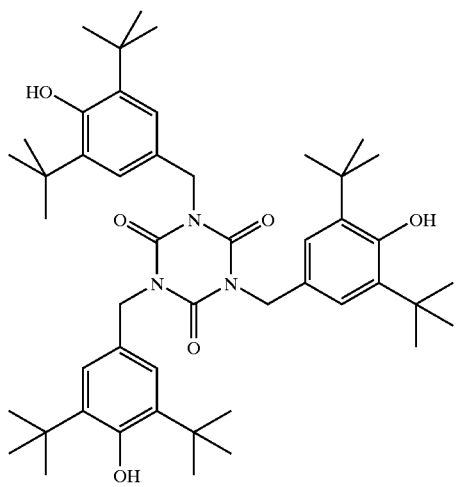
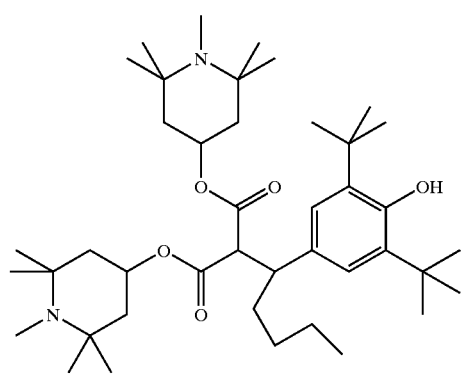
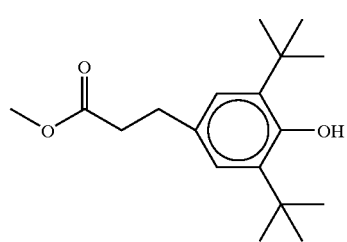
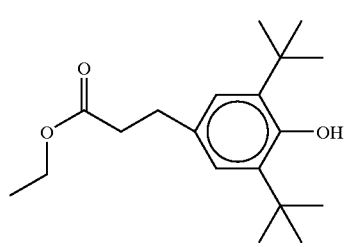
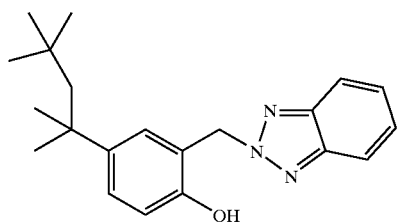

TABLE D-continued
Stabilisers which can be added, for example, to the mixtures according to the invention are shown below.
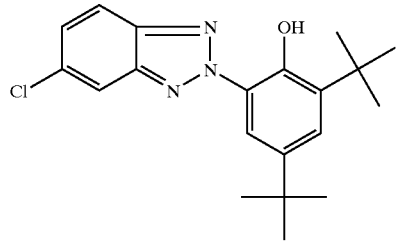
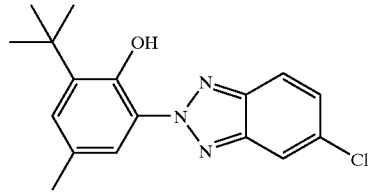
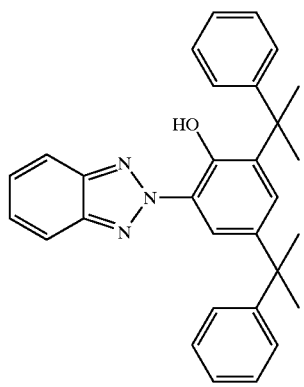
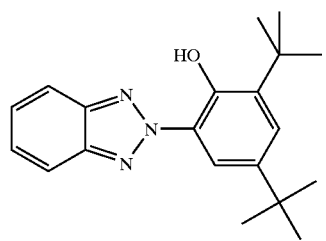
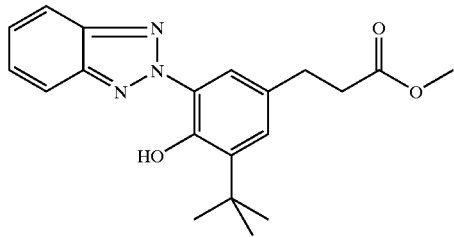
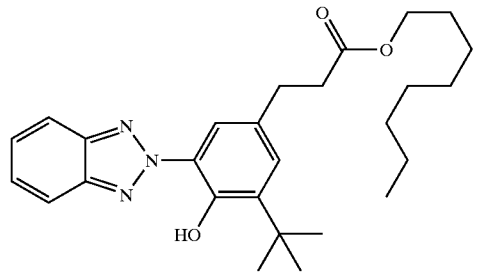
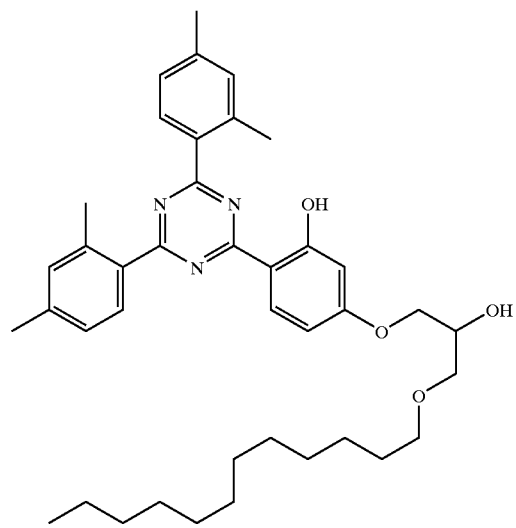
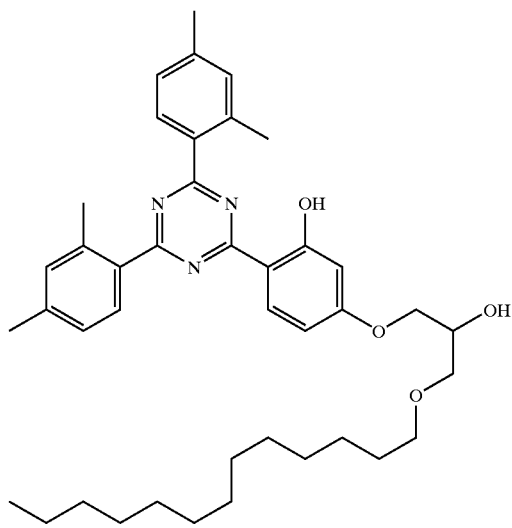

TABLE D-continued

Stabilisers which can be added, for example, to the mixtures according to the invention are shown below.

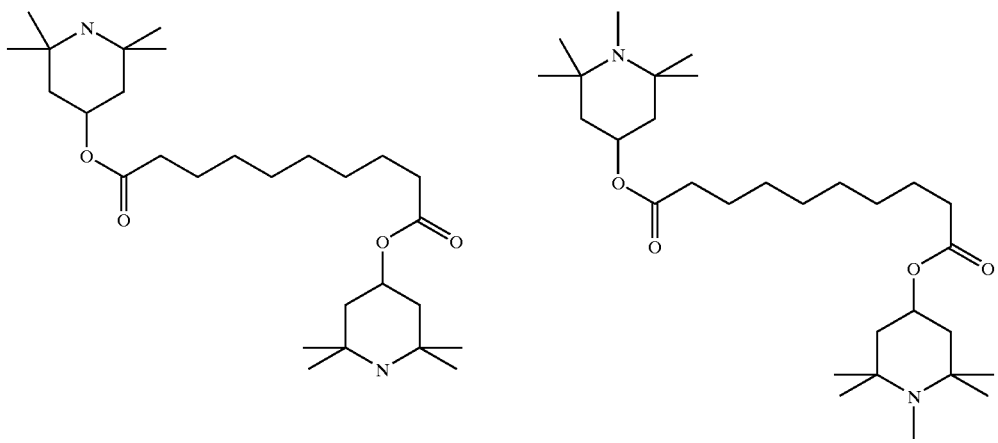

The following examples are intended to explain the invention without limiting it. Above and below, percentages are percent by weight. All temperatures are indicated in degrees Celsius. m.p. denotes melting point, cl.p. indicates clearing point. Furthermore, C=crystalline state, N=nematic phase, S=smectic phase and I=isotropic phase. The data between these symbols represent the transition temperatures. $\Delta n$ denotes optical anisotropy (589 nm, 20° C.). The rotational viscosity $\gamma_1$ (mPa·s) was determined at 20° C.

EXAMPLE 1

A liquid-crystalline medium comprising

| A liquid-crystalline medium comprising | | | |
|---|---|---|---|
| CCZU-2-F | 5.00% | Clearing point [° C.]: | 65.5 |
| CCZU-3-F | 14.00% | S-N transition [° C.]: | <−40 |
| CCZU-5-F | 4.00% | $\Delta n$ [589 nm, 20° C.]: | 0.0909 |
| BCH-3F.F.F | 7.00% | $\gamma_1$ [mPa · s]: | 139 |
| CGU-2-F | 10.00% | $V_{(10,0,20)}$ [V]: | 1.15 |
| CGU-3-F | 10.00% | | |
| CGU-5-F | 5.00% | | |
| CCP-20CF$_3$ | 6.00% | | |
| CCP-30CF$_3$ | 8.00% | | |
| CCP-2F.F.F | 10.00% | | |
| CCP-3F.F.F | 9.00% | | |
| CC-1V-V1 | 4.00% | | |
| IS-5501 | 8.00% | | |

EXAMPLE 2

A liquid-crystalline medium comprising

| A liquid-crystalline medium comprising | | | |
|---|---|---|---|
| PCH-5F | 3.59% | Clearing point [° C.]: | 97.2 |
| CCP-20CF2.F.F | 19.12% | $\Delta\epsilon$ [1 kHz, 20° C.]: | +8.2 |
| CCP-30CF2.F.F | 17.95% | $V_{(10,0,20)}$ [V]: | 1.38 |
| CCP-50CF2.F.F | 19.12% | | |
| CUP-2F.F | 6.01% | | |
| CUP-3F.F | 6.01% | | |
| CBC-33F | 6.01% | | |
| CBC-53F | 6.01% | | |

-continued

| A liquid-crystalline medium comprising | |
|---|---|
| CBC-55F | 5.92% |
| IS-5501 | 10.24% |

EXAMPLE 3

A liquid-crystalline medium comprising

| A liquid-crystalline medium comprising | | | |
|---|---|---|---|
| CCZU-2-F | 5.00% | Clearing point [° C.]: | 70.2 |
| CCZU-3-F | 15.00% | | |
| CCZU-4-F | 5.00% | | |
| CGU-2-F | 10.00% | | |
| CGU-3-F | 10.00% | | |
| CGU-5-F | 6.00% | | |
| BCH-3F.F.F | 5.00% | | |
| CCP-2F.F.F | 10.00% | | |
| CCP-20CF$_3$ | 9.00% | | |
| CCZG-2-OT | 10.00% | | |
| CCZG-3-OT | 5.00% | | |
| CC-3-V1 | 4.00% | | |
| IS-5501 | 6.00% | | |

EXAMPLE 4

A liquid-crystalline medium comprising

| A liquid-crystalline medium comprising | | | |
|---|---|---|---|
| PCH-5F | 8.50% | Clearing point [° C.]: | 83.0 |
| PCH-6F | 6.80% | $\Delta\epsilon$ [1 kHz, 20° C.]: | +6.0 |
| PCH-7F | 5.10% | $K_1$ [pN, 20° C.]: | 12.2 |
| CCP-20CF$_3$ | 6.80% | $K_3/K_1$: | 1.41 |
| CCP-30CF$_3$ | 10.20% | | |
| CCP-40CF$_3$ | 6.00% | | |
| CCP-50CF$_3$ | 9.30% | | |
| BCH-3F.F | 10.30% | | |
| BCH-5F.F | 8.50% | | |
| ECCP-30CF$_3$ | 4.20% | | |

-continued

| A liquid-crystalline medium comprising | |
|---|---|
| ECCP-50CF$_3$ | 4.20% |
| CBC-33F | 1.70% |
| CBC-53F | 1.70% |
| CBC-55F | 1.70% |
| IS-5501 | 5.00% |
| IS-5643 | 5.50% |
| IS-5364 | 4.50% |

EXAMPLE 5

A liquid-crystalline medium comprising

| A liquid-crystalline medium comprising | | | |
|---|---|---|---|
| PCH-5F | 9.00% | Clearing point [° C.]: | 87.0 |
| PCH-6F | 7.20% | Δn [589 nm, 20° C.]: | 0.0953 |
| PCH-7F | 5.40% | Δε [1 kHz, 20° C.]: | +5.8 |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| BCH-3F.F | 10.80% | | |
| BCH-5F.F | 9.00% | | |
| ECCP-30CF$_3$ | 4.50% | | |
| ECCP-50CF$_3$ | 4.50% | | |
| CBC-33F | 1.80% | | |
| CBC-53F | 1.80% | | |
| CBC-55F | 1.80% | | |
| IS-5501 | 10.00% | | |

EXAMPLE 6

| A liquid-crystalline medium comprising | | | |
|---|---|---|---|
| PCH-7F | 6.00% | Clearing point [° C.]: | 93.0 |
| CCP-20CF$_3$ | 11.00% | Δn [589 nm, 20° C.]: | 0.0943 |
| CCP-30CF$_3$ | 12.00% | V$_{(10,0,20)}$ [V]: | 1.55 |
| CCP-40CF$_3$ | 10.00% | | |
| CCP-50CF$_3$ | 12.00% | | |
| BCH-3F.F.F | 12.00% | | |
| BCH-5F.F.F | 11.00% | | |
| CCP-3F.F.F | 12.00% | | |
| CCP-5F.F.F | 9.00% | | |
| IS-5501 | 5.00% | | |

EXAMPLE 7

A liquid-crystalline medium comprising

| A liquid-crystalline medium comprising | | | |
|---|---|---|---|
| CCP-20CF$_3$ | 11.00% | Clearing point [° C.]: | 98.0 |
| CCP-30CF$_3$ | 12.00% | Δn [589 nm, 20° C.]: | 0.0983 |
| CCP-40CF$_3$ | 10.00% | V$_{(10,0,20)}$ [V]: | 1.50 |
| CCP-50CF$_3$ | 12.00% | | |
| BCH-3F.F.F | 12.00% | | |
| BCH-5F.F.F | 11.00% | | |
| CCP-3F.F.F | 12.00% | | |
| CCP-5F.F.F | 9.00% | | |
| IS-5501 | 11.00% | | |

EXAMPLE 8

A liquid-crystalline medium comprising

| A liquid-crystalline medium comprising | | | |
|---|---|---|---|
| CCP-20CF$_3$ | 11.00% | Clearing point [° C.]: | 71.4 |
| CCP-30CF$_3$ | 12.00% | | |
| CCP-40CF$_3$ | 10.00% | | |
| CCP-50CF$_3$ | 12.00% | | |
| BCH-3F.F.F | 12.00% | | |
| BCH-5F.F.F | 11.00% | | |
| CCP-3F.F.F | 12.00% | | |
| CCP-5F.F.F | 9.00% | | |
| IS-5501 | 5.00% | | |
| IS-5364 | 6.00% | | |

EXAMPLE 9

A liquid-crystalline medium comprising

| A liquid-crystalline medium comprising | | | |
|---|---|---|---|
| PCH-5F | 9.00% | Clearing point [° C.]: | 87.0 |
| PCH-6F | 7.20% | Δn [589 nm, 20° C.]: | 0.0951 |
| PCH-7F | 5.40% | Δε [1 kHz, 20° C.]: | +5.7 |
| CCP-20CF$_3$ | 7.20% | γ$_1$ [mPa · s, 20° C.]: | 121 |
| CCP-30CF$_3$ | 10.80% | | |
| CCP-40CF$_3$ | 6.30% | | |
| CCP-50CF$_3$ | 9.90% | | |
| BCH-3F.F | 10.80% | | |
| BCH-5F.F | 9.00% | | |
| ECCP-30CF$_3$ | 4.50% | | |
| ECCP-50CF$_3$ | 4.50% | | |
| CBC-33F | 1.80% | | |
| CBC-53F | 1.80% | | |
| CBC-55F | 1.80% | | |
| IS-5364 | 10.00% | | |

EXAMPLE 10

A liquid-crystalline medium comprising

| A liquid-crystalline medium comprising | | | |
|---|---|---|---|
| PCH-5F | 5.00% | Clearing point [° C.]: | 90.8 |
| CCP-20CF$_3$ | 11.00% | | |
| CCP-30CF$_3$ | 12.00% | | |
| CCP-40CF$_3$ | 10.00% | | |
| CCP-50CF$_3$ | 12.00% | | |
| BCH-3F.F.F | 12.00% | | |
| BCH-5F.F.F | 11.00% | | |
| CCP-3F.F.F | 12.00% | | |
| CCP-5F.F.F | 9.00% | | |
| IS-5364 | 6.00% | | |

EXAMPLE 11

| | | | |
|---|---|---|---|
| CC-3-V1 | 10.00% | Clearing point [° C.]: | +80.0 |
| CC-5-V | 10.00% | Δn [589 nm, 20° C.]: | +0.1033 |
| CCH-35 | 5.00% | d · Δn [μm, 20° C.]: | 0.50 |
| IS-5501 | 8.00% | Twist [°]: | 90 |
| IS-5643 | 4.00% | V$_{10,0,20}$ [V]: | 1.37 |
| CCP-20CF$_3$ | 8.00% | | |
| CCP-30CF$_3$ | 3.00% | | |
| CCP-2F.F.F | 3.00% | | |

-continued

| | |
|---|---|
| PGU-2-F | 8.00% |
| PGU-3-F | 8.00% |
| CGZP-2-OT | 11.00% |
| CGZP-3-OT | 9.00% |
| CCZU-2-F | 4.00% |
| CCZU-3-F | 9.00% |

EXAMPLE 12

| | | | |
|---|---|---|---|
| CCH-35 | 4.00% | S → N [° C.]: | <−40.0 |
| IS-5501 | 9.00% | Clearing point [° C.]: | +78.5 |
| CCP-2F.F.F | 10.00% | Δn [589 nm, 20° C.]: | +0.1033 |
| CCP-3F.F.F | 11.00% | d · Δn [μm, 20° C.]: | 0.50 |
| CCP-20CF$_3$.F | 9.00% | Twist [°]: | 90 |
| CCP-20CF$_3$ | 8.00% | | |
| CCP-30CF$_3$ | 8.00% | | |
| CCP-40CF$_3$ | 7.00% | | |
| CCP-50CF$_3$ | 4.00% | | |
| CGU-2-F | 10.00% | | |
| CGU-3-F | 11.00% | | |
| CGU-5-F | 4.00% | | |
| CCGU-3-F | 5.00% | | |

EXAMPLE 13

| | | | |
|---|---|---|---|
| PCH-3 | 22.50% | Clearing point [° C.]: | +111.0 |
| K6 | 7.20% | Δε: | +9.8 |
| K9 | 8.10% | K$_1$ [pN]: | 14.8 |
| CCP-20CF$_3$ | 4.50% | K$_3$/K$_1$: | 1.55 |
| CCP-30CF$_3$ | 4.50% | | |
| CCP-40CF$_3$ | 4.50% | | |
| CCP-50CF$_3$ | 4.50% | | |
| ECCP-20CF$_3$ | 4.50% | | |
| ECCP-30CF$_3$ | 4.50% | | |
| ECCP-50CF$_3$ | 4.50% | | |
| ECCP-3F | 4.50% | | |
| ECCP-5F | 4.50% | | |
| CBC-33F | 4.50% | | |
| CBC-53F | 3.60% | | |
| CBC-55F | 3.60% | | |
| IS-5840 | 10.00% | | |

EXAMPLE 14

| | | | |
|---|---|---|---|
| PCH-6F | 7.20% | Clearing point [° C.]: | +93.0 |
| PCH-7F | 5.40% | γ$_1$: [20° C., mPa · s]: | 140 |
| CCP-20CF$_3$ | 7.20% | | |
| CCP-30CF$_3$ | 10.80% | | |
| CCP-40CF$_3$ | 6.30% | | |
| PCH-5F | 9.00% | | |
| CCP-50CF$_3$ | 9.90% | | |
| BCH-3F.F | 10.80% | | |
| BCH-5F.F | 9.00% | | |
| ECCP-30CF$_3$ | 4.50% | | |
| ECCP-50CF$_3$ | 4.50% | | |
| CBC-33F | 1.80% | | |
| CBC-53F | 1.80% | | |
| CBCF-55F | 1.80% | | |
| IS-5840 | 10.01% | | |

EXAMPLE 15

| | | | |
|---|---|---|---|
| PCH-3 | 22.49% | Clearing point [° C.]: | +100.6 |
| K6 | 7.20% | Δε: | +9.8 |
| K9 | 8.10% | | |
| CCP-20CF$_3$ | 4.50% | | |
| CCP-30CF$_3$ | 4.50% | | |
| CCP-40CF$_3$ | 4.50% | | |
| CCP-50CF$_3$ | 4.50% | | |
| ECCP-20CF$_3$ | 4.50% | | |
| ECCP-30CF$_3$ | 4.50% | | |
| ECCP-50CF$_3$ | 4.50% | | |
| ECCP-3F | 4.50% | | |
| ECCP-5F | 4.50% | | |
| CBC-33F | 4.50% | | |
| CBC-53F | 3.60% | | |
| CBC-55F | 3.60% | | |
| IS-5840 | 10.03% | | |

EXAMPLE 16

| | | | |
|---|---|---|---|
| BCH-3F.F | 10.80% | Clearing point [° C.]: | +65.8 |
| BCH-5F.F | 9.00% | γ$_1$ [20° C., mPa · s]: | 91 |
| ECCP-30CF$_3$ | 4.50% | d · Δn [20° C., μm]: | 0.50 |
| ECCP-50CF$_3$ | 4.50% | Twist [°]: | 90 |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| IS-5083 | 9.97% | | |

EXAMPLE 17

| | | | |
|---|---|---|---|
| CCZU-2-F | 3.00% | Clearing point [° C.]: | +70.5 |
| CCZU-3-F | 13.00% | Δn: | +0.0772 |
| CCP-20CF$_3$ | 4.00% | γ$_1$ [20° C., mPa · s]: | 54 |
| CCP-30CF$_3$ | 8.00% | d · Δn [20° C., μm]: | 0.50 |
| CGZP-2-OT | 7.00% | Twist [°]: | 90 |
| CGZP-3-OT | 6.00% | V$_{10}$ [V]: | 1.73 |
| PGU-2-F | 5.00% | | |
| IS-5083 | 7.00% | | |
| CC-5-V | 10.00% | | |
| CC-3-V1 | 12.00% | | |
| CCH-35 | 5.00% | | |
| CC-3-V | 18.00% | | |
| BCH-32 | 2.00% | | |

EXAMPLE 18

| | | | |
|---|---|---|---|
| CCZU-2-F | 3.00% | Clearing point [° C.]: | +74.5 |
| CCZU-3-F | 13.00% | Δn: | +0.0776 |
| CCP-20CF$_3$ | 7.00% | γ$_1$ [20° C., mPa · s]: | 57 |
| CCP-30CF$_3$ | 6.00% | d · Δn [20° C., μm]: | 0.50 |
| CGZP-2-OT | 8.00% | Twist [°]: | 90 |
| CGZP-3-OT | 7.00% | V$_{10}$ [V]: | 1.81 |
| PGU-2-F | 3.00% | | |
| IS-5083 | 6.00% | | |
| CC-5-V | 7.00% | | |
| CC-3-V1 | 13.00% | | |

-continued

| | |
|---|---|
| CCH-35 | 5.00% |
| CC-3-V | 19.00% |
| BCH-32 | 3.00% |

EXAMPLE 19

| | |
|---|---|
| CCZU-2-F | 3.00% |
| CZU-3-F | 13.00% |
| CCP-20CF$_3$ | 7.00% |
| CGZP-2-OT | 7.00% |
| CGZP-3-OT | 6.00% |
| PGU-2-F | 4.00% |
| IS-5083 | 6.00% |
| CC-5-V | 10.00% |
| CC-3-V1 | 11.00% |
| CCH-35 | 5.00% |
| CC-3-V | 18.00% |
| CBC-33 | 3.00% |

EXAMPLE 20

| | |
|---|---|
| PCH-3 | 20.00% |
| K6 | 6.40% |
| K9 | 7.20% |
| CCP-20CF$_3$ | 4.00% |
| CCP-30CF$_3$ | 4.00% |
| CCP-40CF$_3$ | 4.00% |
| CCP-50CF$_3$ | 4.00% |
| ECCP-20CF$_3$ | 4.00% |
| ECCP-30CF$_3$ | 4.00% |
| ECCP-50CF$_3$ | 4.00% |
| ECCP-3F | 4.00% |
| ECCP-5F | 4.00% |
| CBC-33F | 4.00% |
| CBC-53F | 3.20% |
| CBC-55F | 3.20% |
| IS-5930 | 20.00% |

EXAMPLE 21

| | | | |
|---|---|---|---|
| PCH-6F | 7.60% | Clearing point [° C.]: | +91.1 |
| PCH-7F | 5.70% | γ$_1$ [20° C., mPa · s]: | 141 |
| CCP-20CF$_3$ | 7.60% | | |
| CCP-30CF$_3$ | 11.40% | | |
| CCP-40CF$_3$ | 6.65% | | |
| PCH-5F | 9.50% | | |
| CCP-50CF$_3$ | 10.45% | | |
| BCH-3F.F | 11.40% | | |
| BCH-5F.F | 9.50% | | |
| ECCP-30CF$_3$ | 4.75% | | |
| ECCP-50CF$_3$ | 4.75% | | |
| CBC-33F | 1.90% | | |
| CBC-53F | 1.90% | | |
| CBC-55F | 1.90% | | |
| IS-5930 | 5.01% | | |

EXAMPLE 22

| | |
|---|---|
| IS-5570 | 20.00% |
| PCH-5F | 3.20% |

-continued

| | |
|---|---|
| CCP-30CF$_2$.F.F | 16.00% |
| CCP-50CF$_2$.F.F | 17.04% |
| CUP-2F.F | 5.36% |
| CUP-3F.F | 5.36% |
| CBC-33F | 5.36% |
| CBC-53F | 5.36% |
| CBC-55F | 5.28% |
| CCP-20CF$_2$.F.F | 17.04% |

What is claimed is:

1. Liquid-crystalline medium based on a mixture of polar compounds of positive dielectric anisotropy, which comprises:

one or more compounds of the formula I

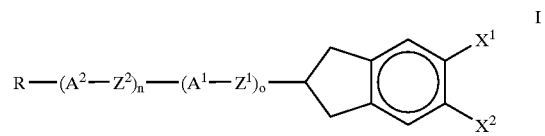

in which

R is F, Cl, Br, I, CN, NCS, SF$_5$ or an alkyl radical having from 1 to 12 carbon atoms which is unsubstituted, monosubstituted by CN or CF$_3$ or monosubstituted or polysubstituted by halogen and in which one or two non-adjacent CH$_2$ groups are optionally replaced by —O—, —CH=CH—, —CF=CF—, —C≡C—, —CO—, —OCO— or —COO— in such a way that O atoms are not linked directly to one another, A$^1$ and A$^2$ are each, independently of one another, 1,4-phenylene, in which one or two CH groups are optionally replaced by N and which is optionally monosubstituted or polysubstituted by L, or are trans-1,4-cyclohexylene, in which one or more non-adjacent CH$_2$ groups are optionally replaced by —O— and/or —S—, or are 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, L is F, Cl, Br, I, CN, NCS, SF$_5$ or alkyl, alkoxy, alkylcarbonyl, alkylcarbonyloxy, alkoxycarbonyl, alkenyl or oxaalkenyl having from 1 to 3 carbon atoms, in which one or more H atoms are optionally replaced by F or Cl, Z$^1$ and Z$^2$ are each, independently of one another, —CH$_2$O—, —OCH$_2$—, —CF$_2$O—, —OCF$_2$—, —COO—, —OCO—, —CF$_2$CF$_2$—, —CH$_2$CH$_2$—, —(CH$_2$)$_4$—, —(CH$_2$)$_3$O—, —O(CH$_2$)$_3$—, —CF$_2$CH$_2$—, —CH=CH—, —CH=CF—, —CF=CF—, —C≡C— or a single bond, X$^1$ and X$^2$ are each, independently of one another, F, Cl, Br, I, CN, NCS, SF$_5$ or alkyl, alkoxy, alkylcarbonyl, alkylcarbonyloxy, alkoxycarbonyl, alkenyl or oxaalkenyl having 1 to 5 carbon atoms, in which one or more H atoms are optionally replaced by F or Cl, and one of the radicals X$^1$ and X$^2$ is alternatively H or R, and n and o are each, independently of one another, 0, 1 or 2, where n+o is ≦3 and, one or more compounds selected from the group consisting of the compounds of formulae II, III, IV, V, VI and VII:

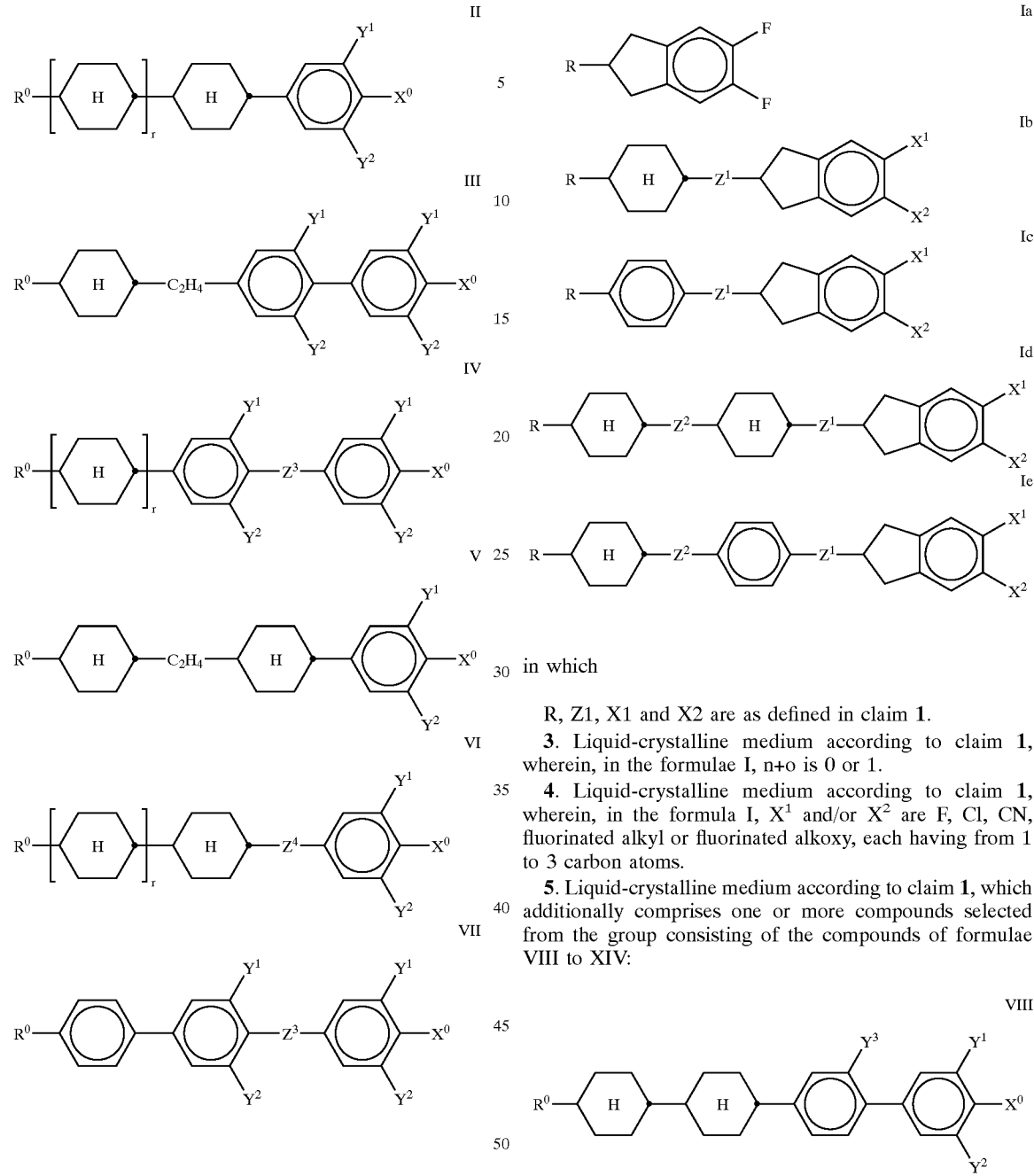

in which the individuals have the following meanings:

R⁰ is n-alkyl, alkoxy, fluoroalkyl, alkenyl or oxaalkenyl, each having 1 to 9 carbon atoms, $Z^3$ is —COO—, —CF$_2$O—, —C$_2$F$_4$— or a single bond, $Z^4$ is —COO—, —CF$_2$O—, —C$_2$H$_4$—, $X^0$ is F, Cl, halogenated alkyl, alkenyl or alkoxy having from 1 to 6 carbon atoms.

$Y^1$ and $Y^2$ are each, independently of one another, H or F, and r is 0 or 1.

2. Liquid-crystalline medium according to claim 1, which comprises one or more compounds of the formulae Ia to Ie:

in which

R, Z1, X1 and X2 are as defined in claim 1.

3. Liquid-crystalline medium according to claim 1, wherein, in the formulae I, n+o is 0 or 1.

4. Liquid-crystalline medium according to claim 1, wherein, in the formula I, $X^1$ and/or $X^2$ are F, Cl, CN, fluorinated alkyl or fluorinated alkoxy, each having from 1 to 3 carbon atoms.

5. Liquid-crystalline medium according to claim 1, which additionally comprises one or more compounds selected from the group consisting of the compounds of formulae VIII to XIV:

-continued

XI
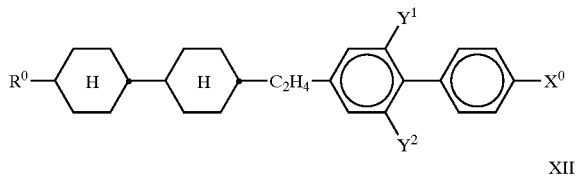

XII
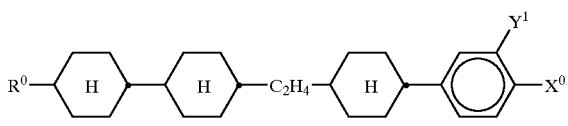

XIII
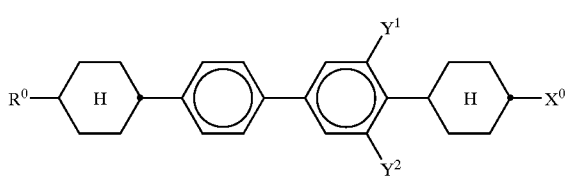

XIV
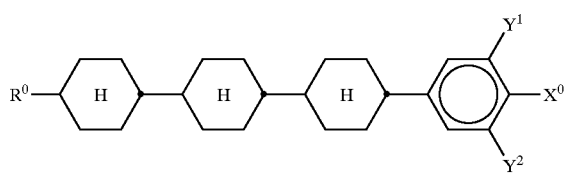

in which

R⁰, X⁰, Y¹ and Y² are as defined in claim 1.

6. Liquid-crystalline medium according to claim 1, which additionally comprises one or more compounds selected from the group consisting of the compounds of formulae XXI to XXVII:

XXI
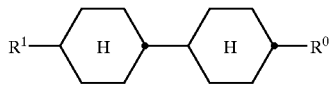

XXII
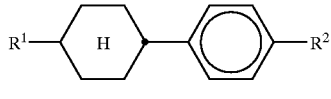

XXIII
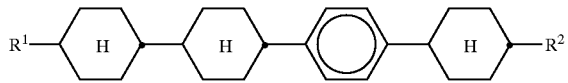

XXIV
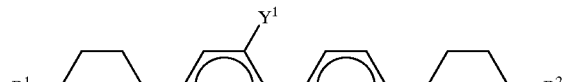

XXV
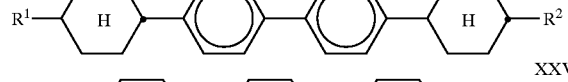

XXVI

XXVII
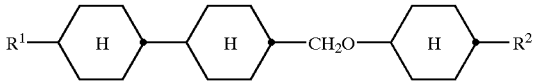

in which $R^0$ and $Y^1$ are as defined in claim 1, and $R^1$ and $R^2$ are each, independently of one another, alkyl or alkoxy having from 1 to 8 carbon atoms or alkenyl having from 2 to 7 carbon atoms.

7. Liquid-crystalline medium according to claim 1, wherein the proportion of compounds of the formula I in the mixture as a whole is from 2 to 55% by weight.

8. Liquid-crystalline medium according claim 1, wherein the proportion of compounds of the formulae I to VII in the mixture as a whole is at least 50% by weight.

9. Electro-optical liquid-crystal display containing a liquid-crystalline medium according to claim 1.

10. Liquid-crystalline medium based on a mixture of polar compounds of positive dielectric anisotropy, which comprises:

one or more compounds of the formula I

I
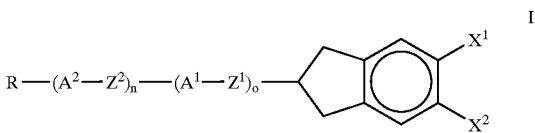

in which

R is F, Cl, Br, I, CN, NCS, $SF_5$ or an alkyl radical having from 1 to 12 carbon atoms which is unsubstituted, monosubstituted by CN or $CF_3$ or monosubstituted or polysubstituted by halogen and in which one or two non-adjacent $CH_2$ groups are optionally replaced by —O—, —CH=CH—, —CF=CF—, —C≡C—, —CO—, —OCO— or —COO— in such a way that 0.0 atoms are not linked directly to one another, $A^1$ and $A^2$ are each, independently of one another, 1,4-phenylene, in which one or two CH groups are optionally replaced by N and which is optionally monosubstituted or polysubstituted by L, or are trans-1,4-cyclohexylene, in which one or more non-adjacent $CH_2$ groups are optionally replaced by —O— and/or —S—, or are 1,4-cyclohexenylene, 1,4-bicyclo-[2.2.2] octylene, piperidine-1,4-diyl, naphthalene-2,6-diyl, decahydronaphthalene-2,6-diyl or 1,2,3,4-tetrahydronaphthalene-2,6-diyl, L is F, Cl, Br, I, CN, NCS, $SF_5$ or alkyl, alkoxy, alkylcarbonyl, alkylcarbonyloxy, alkoxycarbonyl, alkenyl or oxaalkenyl having from 1 to 3 carbon atoms, in which one or more H atoms are optionally replaced by F or Cl, $Z^1$ and $Z^2$ are each, independently of one another, —$CH_2O$—, —$OCH_2$—, —$CF_2O$—, —$OCF_2$—, —COO—, —OCO—, —$CF_2CF_2$—, —$CH_2CH_2$—, —$(CH_2)_4$—, —$(CH_2)_3O$—, —$O(CH_2)_3$—, —$CF_2CH_2$—, —CH=CH—, —CH=CF—, —CF=CF—, —C≡C— or a single bond, $X^1$ and $X^2$ are each, independently of one another, F, Cl, Br, I, CN, NCS, $SF_5$ or alkyl, alkoxy, alkylcarbonyl, alkylcarbonyloxy, alkoxycarbonyl, alkenyl or oxaalkenyl having 1 to 5 carbon atoms, in which one or more H atoms are optionally replaced by F or Cl, and one of the radicals $X^1$ and $X^2$ is alternatively H or R, and n and o are each, independently of one another, 0, 1 or 2, where n+o is <3; and, one or more compounds selected from the group consisting of the compounds of formulae VIII to XIV:

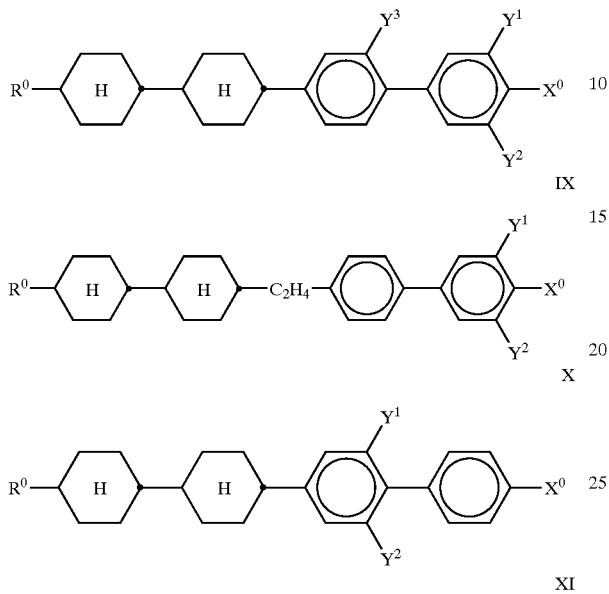

VIII

IX

X

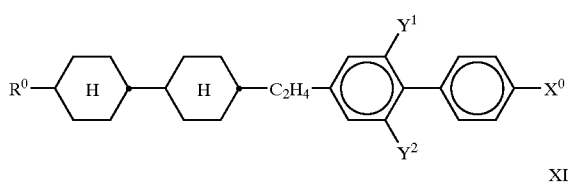

XI

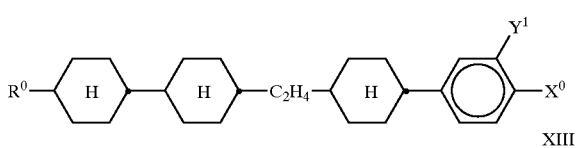

XII

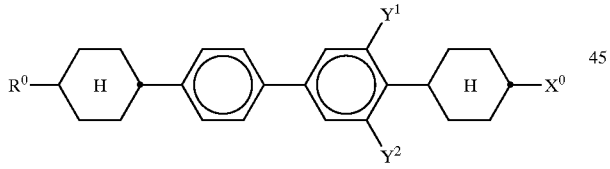

XIII

XIV in which $R^0$ is n-alkyl, alkoxy, fluoroalkyl, alkenyl or oxaalkenyl, each having 1 to 9 carbon atoms, $X^0$ is F, Cl, halogenated alkyl, alkenyl or alkoxy having from 1 to 6 carbon atoms, $Y^1$ and $Y^2$ are each, independently of one another, H or F.

11. Liquid-crystalline medium according to claim 10, which comprises one or more compounds of the formulae Ia to Ie:

Ia

Ib

Ic

Id

Ie in which

R, $Z^1$, $X^1$ and $X^2$ are as defined in claim 10.

12. Liquid-crystalline medium according to claim 10, wherein, in the formulae I, n+o is 0 or 1.

13. Liquid-crystalline medium according to claim 10, wherein, in the formula I, $X^1$ and/or $X^2$ are F, Cl, CN, fluorinated alkyl or fluorinated alkoxy, each having from 1 to 3 carbon atoms.

14. Liquid-crystalline medium according to claim 10, which additionally comprises one or more compounds selected from the group consisting of the compounds of formulae XXI to XXVII:

XXI

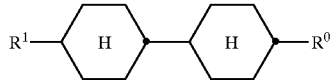

XXII

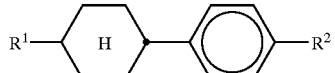

XXIII

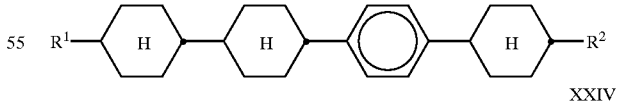

XXIV

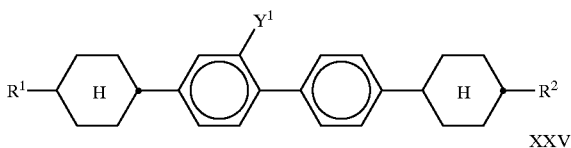

XXV

-continued

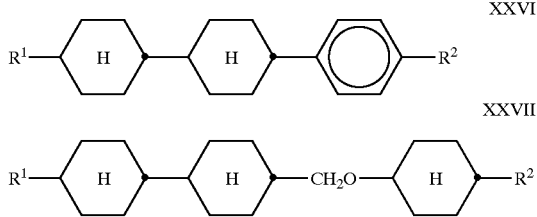

XXVI

XXVII in which $R^0$ and $Y^1$ are as defined in claim and $R^1$ and $R^2$ are each, independently of one another, alkyl or alkoxy having from 1 to 8 carbon atoms or alkenyl having from 2 to 7 carbon atoms.

15. Liquid-crystalline medium according to claim 10, wherein the proportion of compounds of the formula T in the mixture as a whole is from 2 to 55% by weight.

16. Electro-optical liquid-crystal display containing a liquid-crystalline medium according to claim 10.

17. An electro-optical liquid-crystal display of claim 9, wherein the display is a MLC, TN, STN, OCB or IPS display.

18. An electro-optical liquid-crystal display of claim 16, wherein the display is a MLC, TN, STN, OCB or IPS display.

19. Liquid-crystalline medium according to claim 1, wherein the medium retains a nematic phase down to −20° C., has a clearing point above 75° C., and has a dielectric anisotropy of $\geq 5$.

20. Liquid-crystalline medium according to claim 10, wherein the medium retains a nematic phase down to −20° C., has a clearing point above 75° C., and has a dielectric anisotropy of $\geq 5$.

* * * * *

UNITED STATES PATENT AND TRADEMARK OFFICE
CERTIFICATE OF CORRECTION

PATENT NO.   : 6,878,421 B2
DATED        : April 12, 2005
INVENTOR(S)  : Matthias Bremer It is certified that error appears in the above-identified patent and that said Letters Patent is hereby corrected as shown below:

Column 53,
Line 52, delete "individuals" and insert -- individual radicals --.
Line 58, after "–CF$_2$O-" and insert -- -C$_2$F$_4$- or --.

Column 56,
Line 39, delete "0.0" and insert -- O --.

Column 59,
Line 12, after "claim" and insert -- 10, --.
Line 13, delete "T" and insert -- I --.

Signed and Sealed this

Thirtieth Day of August, 2005

JON W. DUDAS
*Director of the United States Patent and Trademark Office*